US012634940B2

(12) United States Patent  
Elshafie et al.

(10) Patent No.: US 12,634,940 B2  
(45) Date of Patent: May 19, 2026

(54) TECHNIQUES FOR TRANSMISSION POWER CONTROL WITH RECONFIGURABLE INTELLIGENT SURFACES

(71) Applicant: QUALCOMM Incorporated, San Diego, CA (US)

(72) Inventors: Ahmed Elshafie, San Diego, CA (US); Yan Zhou, San Diego, CA (US); Yu Zhang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/327,526

(22) Filed: Jun. 1, 2023

(65) Prior Publication Data

US 2024/0406958 A1 Dec. 5, 2024

(51) Int. Cl.  
*H04W 72/20* (2023.01)  
*H04W 28/26* (2009.01)

(52) U.S. Cl.  
CPC ........... *H04W 72/20* (2023.01); *H04W 28/26* (2013.01)

(58) Field of Classification Search  
CPC .............................. H04W 72/20; H04W 28/26  
See application file for complete search history.

(56) References Cited

U.S. PATENT DOCUMENTS

2017/0215152 A1* 7/2017 Byun ................... H04W 52/143  
2022/0377730 A1 11/2022 Yang et al.

2024/0137134 A1* 4/2024 Sahraei ................... H04B 17/12  
2024/0373368 A1* 11/2024 Ly ......................... H04W 52/146  
2025/0211468 A1* 6/2025 Abotabl ............. H04W 52/0216  
2025/0220397 A1* 7/2025 Li ........................... H04W 40/22  
2025/0233622 A1* 7/2025 Elshafie ............. H04B 7/04013

FOREIGN PATENT DOCUMENTS

WO WO-2022213312 A1 10/2022  
WO WO-2023019383 A1 2/2023

OTHER PUBLICATIONS

International Search Report and Written Opinion—PCT/US2024/028263—ISA/EPO—Aug. 21, 2024.

* cited by examiner

*Primary Examiner* — Won Tae C Kim  
(74) *Attorney, Agent, or Firm* — Holland & Hart LLP/Qualcomm Incorporated

(57) ABSTRACT

Methods, systems, and devices for wireless communications are described. Techniques described herein may enable transmission power control (TPC) for user equipments (UEs) supporting reconfigurable intelligent surfaces (RISs). For example, a first UE may receive a control message indicating multiple parameter sets associated with calculating a transmission power for a transmission. Each parameter set may be associated with a communication link, a presence of one or more RISs, and whether the one or more RISs are assisting the first UE or a second UE. The UE may transmit signaling in accordance with a calculated transmission power based on selecting a first parameter set from the multiple parameter sets, where the first parameter set is selected based on a communication link associated with the transmission, a presence of one or more RISs during the transmission, and whether the one or more RISs are assisting the first UE or the second UE.

28 Claims, 16 Drawing Sheets

RIS
410

445-a

435

435

440

445-b

405

415-a

Blockage

440

415-b 425-a 425-b 430-a 430-b

Downlink Slot 420

Uplink Slot 425

Sidelink Slot 430

400

130    105    115

Network
Entity

Transceiver    Antenna 1310    1315

Memory

Code

1330

1325

Communications
Manager

1320

Processor

1340

1335

1305

Figure 14:
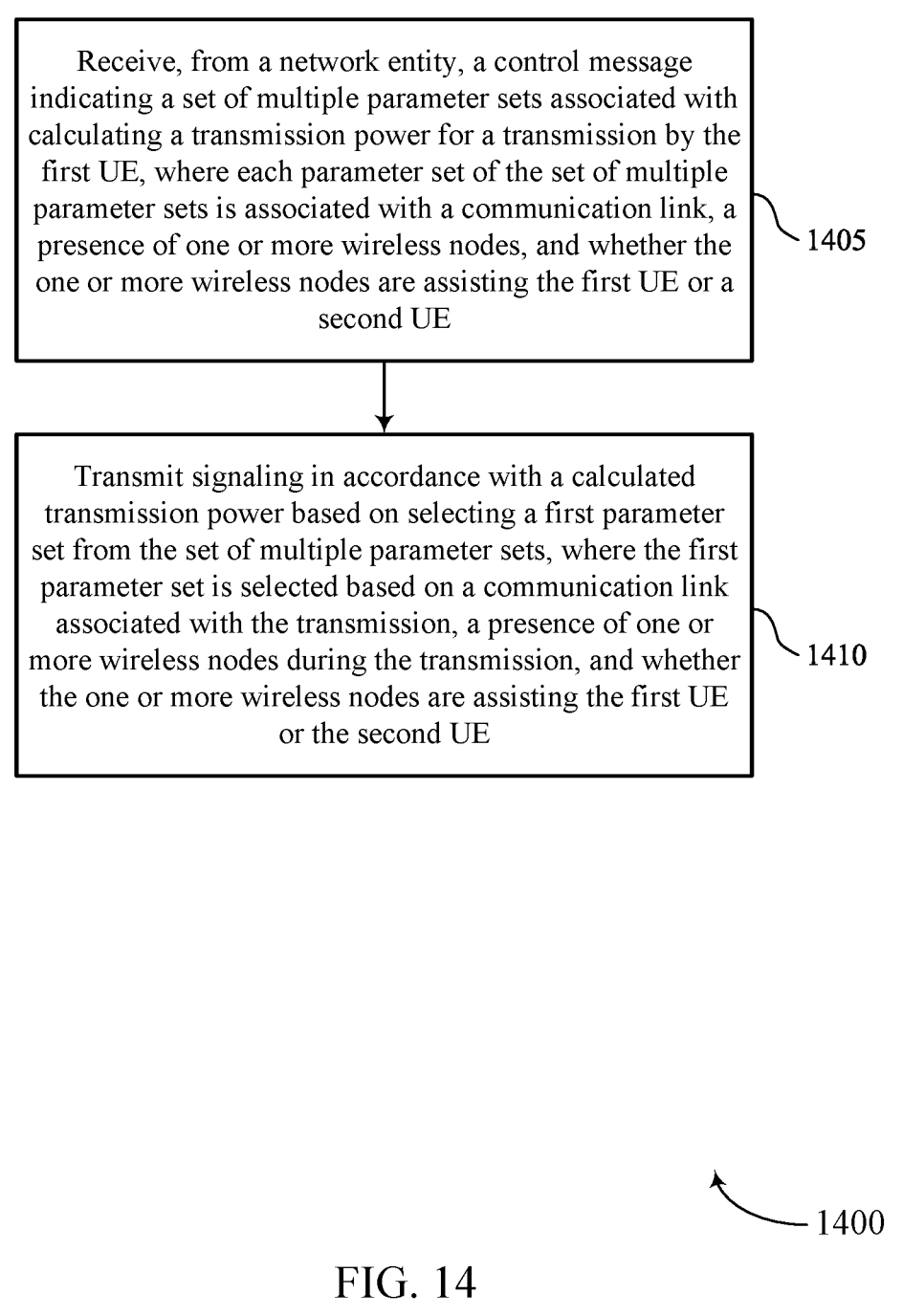

Receive, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE

1405

Transmit signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE

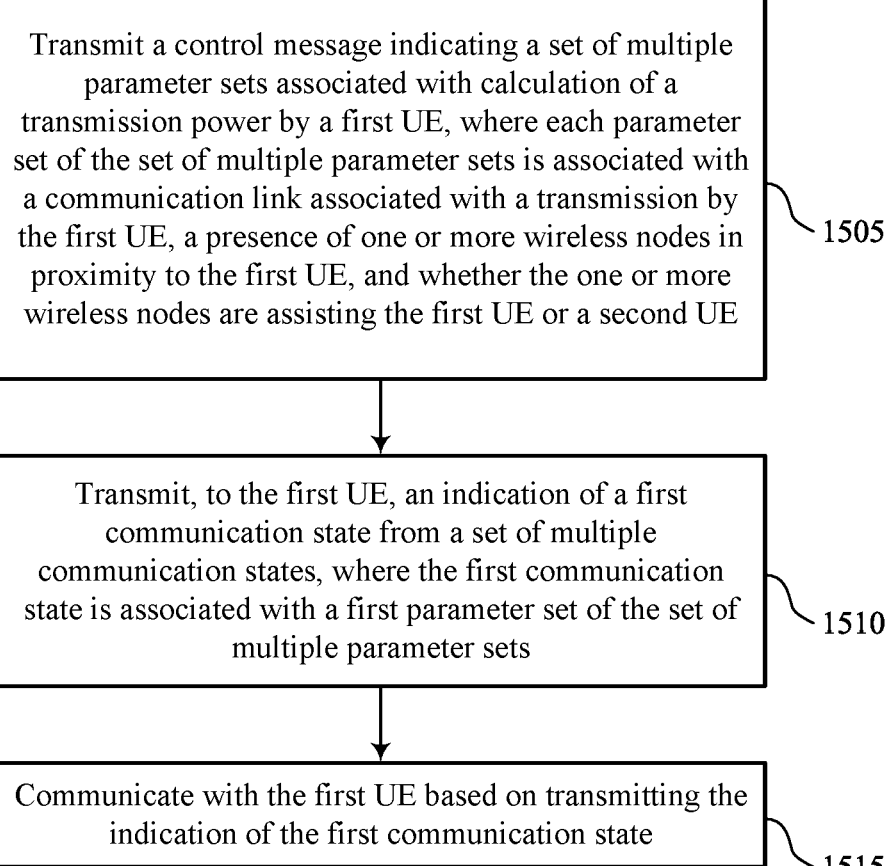

Transmit a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE

1505

Transmit, to the first UE, an indication of a first communication state from a set of multiple communication states, where the first communication state is associated with a first parameter set of the set of multiple parameter sets

1510

Communicate with the first UE based on transmitting the indication of the first communication state

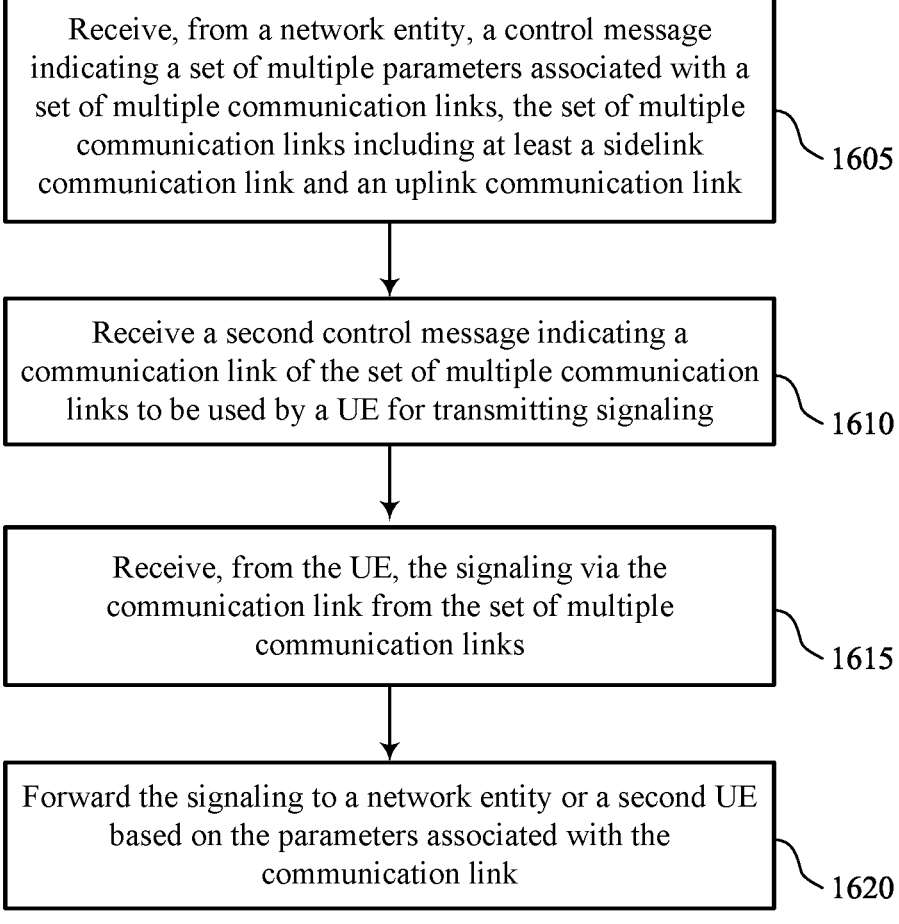

Receive, from a network entity, a control message indicating a set of multiple parameters associated with a set of multiple communication links, the set of multiple communication links including at least a sidelink communication link and an uplink communication link

1605

Receive a second control message indicating a communication link of the set of multiple communication links to be used by a UE for transmitting signaling

1610

Receive, from the UE, the signaling via the communication link from the set of multiple communication links

1615

Forward the signaling to a network entity or a second UE based on the parameters associated with the communication link

TECHNIQUES FOR TRANSMISSION POWER CONTROL WITH RECONFIGURABLE INTELLIGENT SURFACES

FIELD OF DISCLOSURE

The following relates to wireless communications, including techniques for transmission power control (TPC) with reconfigurable intelligent surfaces (RISs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for transmission power control (TPC) with reconfigurable intelligent surfaces (RISs). Generally, the techniques described herein may enable a user equipment (UE) to calculate a transmission power for a communication in a wireless communications system supporting RISs. For example, a first UE may receive, from a network entity, a control message indicating multiple power control configurations, where each power control configuration is associated with a parameter set used to calculate a transmission power for a transmission by the first UE. Each power control configuration may be associated with a communication link, a presence of one or more wireless nodes, and whether the one or more wireless nodes are assisting the first UE or a second UE. In other words, each power control configuration from the multiple power control configurations may be associated with a respective communication state of the first UE, where the communication state is based on the communication link, the presence of one or more wireless nodes, and whether the one or more wireless nodes are assisting the first UE or the second UE. For a given transmission, the first UE may identify a communication state of the first UE based on a communication link to be used for the transmission, a presence of one or more RISs within proximity to the first UE, and whether the one or more RISs are assisting the first UE or the second UE. Accordingly, the first UE may select a power control configuration from the set of power control configurations based on the identifier communication state and may transmit signaling (e.g., perform the transmission)

in accordance with a calculated transmission power based on a parameter set associated with the selected power control configuration.

Additionally, to enable both sidelink communications and uplink communications via RIS, each of the one or more RISs (e.g., if assisting the first UE) may receive an indication of the communication link to be used for the transmission. That is, a first set of parameters may be associated with forwarding sidelink communications and a second set of parameters may be associated with forwarding uplink communications. As such, each of the one or more RISs may receive, from the first UE or a network entity, an indication of the communication link to be used for the transmission and may forward the transmission in accordance with a respective set of parameters.

A method for wireless communications at a first UE is described. The method may include receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE and transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

An apparatus for wireless communications at a first UE is described. The apparatus may include at least one processor, at least one memory coupled with the at least one processor, and instructions stored in the at least one memory. The instructions may be executable by the at least one processor to cause the apparatus to receive, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE and transmit signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

Another apparatus for wireless communications at a first UE is described. The apparatus may include means for receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE and means for transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

A non-transitory computer-readable medium storing code for wireless communications at a first UE is described. The code may include instructions executable by a processor to receive, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE and transmit signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

Some examples of the method, apparatuses, and non-transitory computer-readable medium described herein may further include operations, features, means, or instructions for determining the one or more wireless nodes may be present within a threshold proximity of the UE, where the first parameter set may be associated with the one or more wireless nodes being present.

Some examples of the method, apparatuses, and non-transitory computer-readable medium described herein may further include operations, features, means, or instructions for determining whether the one or more wireless nodes may be assisting the first UE or the second UE, where selecting the first parameter set may be based on the determining.

In some examples of the method, apparatuses, and non-transitory computer-readable medium described herein, determining whether the one or more wireless nodes may be assisting the first UE or the second UE may include operations, features, means, or instructions for receiving an indication of whether the first UE or the second UE, may be communicating with the network entity via the one or more wireless nodes.

In some examples of the method, apparatuses, and non-transitory computer-readable medium described herein, determining whether the one or more wireless nodes may be assisting the first UE or the second UE may include operations, features, means, or instructions for transmitting a reservation message to the one or more wireless nodes, where determining whether the first UE may be communicating with the network entity via the one or more wireless nodes may be based on receiving a confirmation message responsive to the reservation message.

In some examples of the method, apparatuses, and non-transitory computer-readable medium described herein, the first parameter set may be associated with one or more wireless node identifiers associated with the one or more wireless nodes.

Some examples of the method, apparatuses, and non-transitory computer-readable medium described herein may further include operations, features, means, or instructions for transmitting, to the one or more wireless nodes, a control message indicating a set of multiple parameters associated with a set of multiple communication links including at least the communication link associated with the transmission by the first UE.

Some examples of the method, apparatuses, and non-transitory computer-readable medium described herein may further include operations, features, means, or instructions for determining the one or more wireless nodes may be not present within a threshold proximity of the UE, where the first parameter set may be associated with the one or more wireless nodes not being present.

Some examples of the method, apparatuses, and non-transitory computer-readable medium described herein may further include operations, features, means, or instructions for identifying a first communication state from a set of multiple communication states based on the communication link associated with transmission of the signaling, the presence of one or more wireless nodes during the transmission, and whether the one or more wireless nodes may be assisting the first UE or the second UE, where the first set of parameters may be associated with the first communication state.

Some examples of the method, apparatuses, and non-transitory computer-readable medium described herein may further include operations, features, means, or instructions for receiving, from the network entity, an indication of the first communication state from the set of multiple communication states, where applying the first parameter set may be based on receiving the indication.

In some examples of the method, apparatuses, and non-transitory computer-readable medium described herein, each communication state of the set of multiple communication states may be associated with a communication link, a presence of one or more wireless nodes, and whether the one or more wireless nodes may be assisting the first UE or a second UE.

Some examples of the method, apparatuses, and non-transitory computer-readable medium described herein may further include operations, features, means, or instructions for calculating the transmission power for transmission of the signaling based on the first parameter set.

In some examples of the method, apparatuses, and non-transitory computer-readable medium described herein, each parameter set of the set of multiple parameter sets includes a first parameter associated with an elemental antenna gain.

In some examples of the method, apparatuses, and non-transitory computer-readable medium described herein, the communication link includes a sidelink communication link or an uplink communication link.

In some examples of the method, apparatuses, and non-transitory computer-readable medium described herein, the one or more wireless nodes include one or more RISs.

A method for wireless communications at a network entity is described. The method may include transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE, transmitting, to the first UE, an indication of a first communication state from a set of multiple communication states, where the first communication state is associated with a first parameter set of the set of multiple parameter sets, and communicating with the first UE based on transmitting the indication of the first communication state.

An apparatus for wireless communications at a network entity is described. The apparatus may include at least one processor, at least one memory coupled with the at least one processor, and instructions stored in the at least one memory. The instructions may be executable by the at least one processor to cause the apparatus to transmit a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE, transmit, to the first UE, an indication of a first communication state from a set of multiple communication states, where the first communication state is associated with a first parameter set of the set of multiple parameter sets, and communicate with the first UE based on transmitting the indication of the first communication state.

Another apparatus for wireless communications at a network entity is described. The apparatus may include means for transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE, means for transmitting, to the first UE, an indication of a first communication state from a set of multiple communication states, where the first communication state is associated with a first parameter set of the set of multiple parameter sets, and means for communicating with the first UE based on transmitting the indication of the first communication state.

A non-transitory computer-readable medium storing code for wireless communications at a network entity is described. The code may include instructions executable by a processor to transmit a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE, transmit, to the first UE, an indication of a first communication state from a set of multiple communication states, where the first communication state is associated with a first parameter set of the set of multiple parameter sets, and communicate with the first UE based on transmitting the indication of the first communication state.

Some examples of the method, apparatuses, and non-transitory computer-readable medium described herein may further include operations, features, means, or instructions for transmitting, to the one or more wireless nodes, a first control message indicating a set of multiple parameters associated with a set of multiple communication links including at least the communication link associated with the transmission by the first UE.

Some examples of the method, apparatuses, and non-transitory computer-readable medium described herein may further include operations, features, means, or instructions for transmitting, to the one or more wireless nodes, a second control message indicating the communication link associated with the transmission by the first UE.

In some examples of the method, apparatuses, and non-transitory computer-readable medium described herein, the first communication state may be based on one or more wireless node identifiers associated with the one or more wireless nodes.

In some examples of the method, apparatuses, and non-transitory computer-readable medium described herein, each communication state from the set of multiple communication states may be associated with a respective parameter set of the set of multiple parameter sets.

In some examples of the method, apparatuses, and non-transitory computer-readable medium described herein, each parameter set of the set of multiple parameter sets includes a first parameter associated with an elemental antenna gain.

In some examples of the method, apparatuses, and non-transitory computer-readable medium described herein, the communication link includes a sidelink communication link or an uplink communication link.

In some examples of the method, apparatuses, and non-transitory computer-readable medium described herein, the one or more wireless nodes include one or more RISs.

A method for wireless communications at a wireless node is described. The method may include receiving, from a network entity, a control message indicating a set of multiple parameters associated with a set of multiple communication links, the set of multiple communication links including at least a sidelink communication link and an uplink communication link, receiving a second control message indicating a communication link of the set of multiple communication links to be used by a UE for transmitting signaling, receiving, from the UE, the signaling via the communication link from the set of multiple communication links, and forwarding the signaling to a network entity or a second UE based on the parameters associated with the communication link.

An apparatus for wireless communications at a wireless node is described. The apparatus may include at least one processor, at least one memory coupled with the at least one processor, and instructions stored in the at least one memory. The instructions may be executable by the at least one processor to cause the apparatus to receive, from a network entity, a control message indicating a set of multiple parameters associated with a set of multiple communication links, the set of multiple communication links including at least a sidelink communication link and an uplink communication link, receive a second control message indicating a communication link of the set of multiple communication links to be used by a UE for transmitting signaling, receive, from the UE, the signaling via the communication link from the set of multiple communication links, and forward the signaling to a network entity or a second UE based on the parameters associated with the communication link.

Another apparatus for wireless communications at a wireless node is described. The apparatus may include means for receiving, from a network entity, a control message indicating a set of multiple parameters associated with a set of multiple communication links, the set of multiple communication links including at least a sidelink communication link and an uplink communication link, means for receiving a second control message indicating a communication link of the set of multiple communication links to be used by a UE for transmitting signaling, means for receiving, from the UE, the signaling via the communication link from the set of multiple communication links, and means for forwarding the signaling to a network entity or a second UE based on the parameters associated with the communication link.

A non-transitory computer-readable medium storing code for wireless communications at a wireless node is described. The code may include instructions executable by a processor to receive, from a network entity, a control message indicating a set of multiple parameters associated with a set of multiple communication links, the set of multiple communication links including at least a sidelink communication link and an uplink communication link, receive a second control message indicating a communication link of the set of multiple communication links to be used by a UE for transmitting signaling, receive, from the UE, the signaling via the communication link from the set of multiple communication links, and forward the signaling to a network entity or a second UE based on the parameters associated with the communication link.

In some examples of the method, apparatuses, and non-transitory computer-readable medium described herein, the set of multiple parameters includes a beamforming weight associated with each communication link of the set of multiple communication links.

In some examples of the method, apparatuses, and non-transitory computer-readable medium described herein, the second control message may be received from the UE or from the network entity.

In some examples of the method, apparatuses, and non-transitory computer-readable medium described herein, the wireless node may be a RIS.

BRIEF DESCRIPTION OF THE DRAWINGS

FIGS. 14 through 16 show flowcharts illustrating methods that support techniques for TPC with RISs in accordance with one or more aspects of the present disclosure.

DETAILED DESCRIPTION

Figure 1:
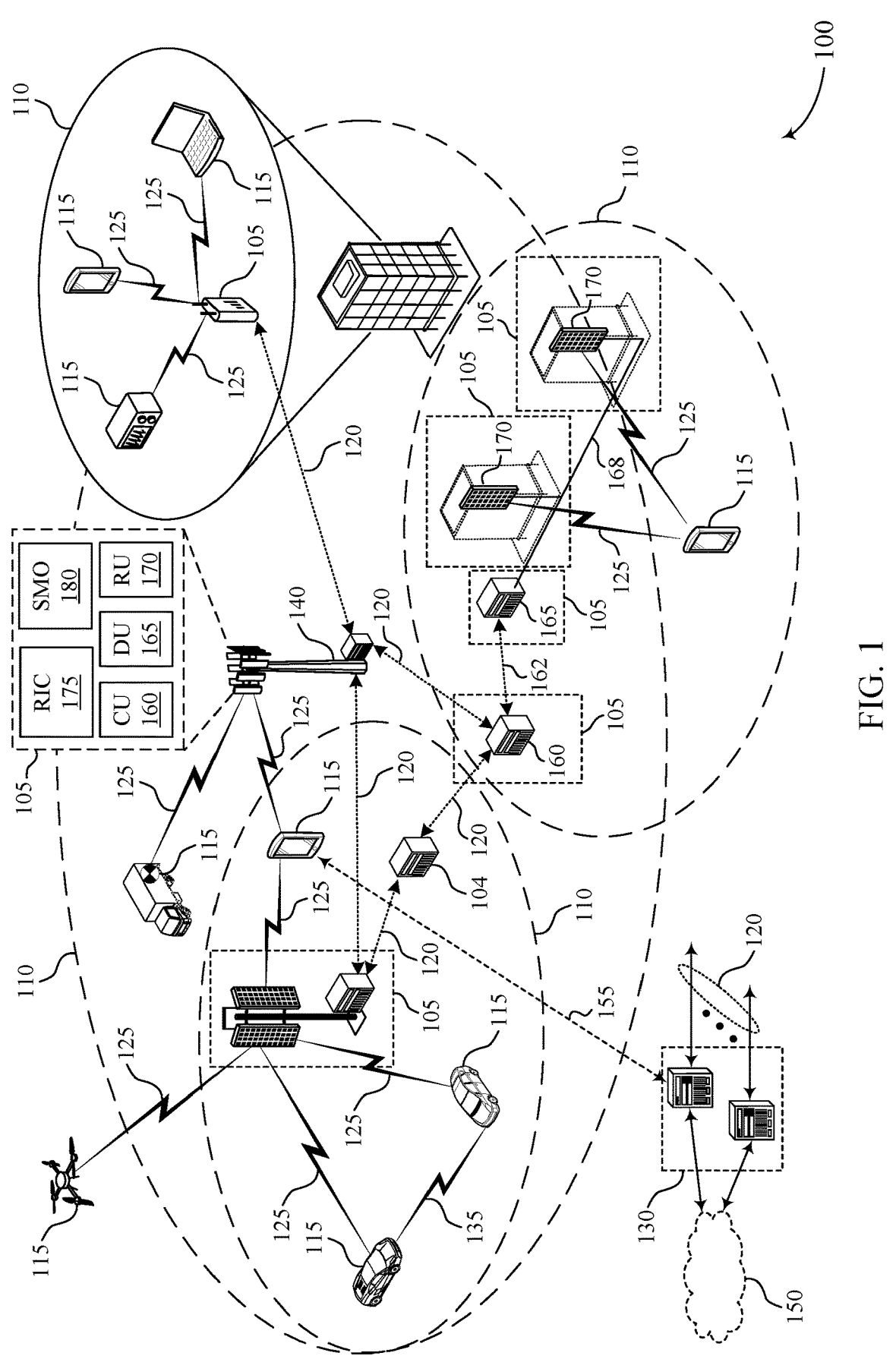
FIG. 1 shows an example of a wireless communications system that supports techniques for transmission power control (TPC) with reconfigurable intelligent surfaces (RISs) in accordance with one or more aspects of the present disclosure.

Some wireless communications systems may support reconfigurable intelligent surfaces (RISs. An RIS may be a near passive device that is capable of reflecting communications from a first wireless device, such as a first user equipment (UE), to a second wireless device, such as a second UE (e.g., sidelink communications) or network entity (e.g., uplink communications), at a desired direction. In some examples, the first UE may apply power controls to communications transmitted to the second UE or the network entity to manage one or more communication characteristics, such as interference, pathloss, or the like thereof. However, the presence of one or more RISs within proximity to the first UE may impact the one or more communication characteristics, specifically pathloss, between the first UE and the second UE or network entity. As such, the first UE may be unable to determine power controls to apply to communications to the second UE or the network entity when one or more RISs are within proximity of the first UE.

Accordingly, techniques described herein may enable the first UE to determine power controls to apply to a transmission to the second UE or the network entity in a wireless communications system that supports RISs. That is, the first UE may select a power control configuration from a set of power control configurations for a transmission based on a communication state of the first UE. For example, the first UE may receive, from a network entity, an indication of multiple power control configurations, where each power control configuration indicates one or more parameters associated with calculating a transmission power for a transmission by the first UE. Additionally, each power control configuration may be associated with a communication state of the first UE from a set of communication states, where each communication state is based on a communication link to be used by the first UE, a presence of one or more RISs within proximity to the first UE, and whether the one or more RISs are assisting the first UE or a second UE. As such, the first UE may identify a communication state of the first UE (e.g., from the set of communication states) and select a power control configuration from the multiple power control configuration based on the identified communication state and perform a transmission in accordance with the selected power control configuration. In other words, the first UE may transmit one or more signals using a calculated transmission power based on the one or more parameters indicated via the selected power control configuration.

Additionally, to enable sidelink and uplink communications via an RIS, the RIS may receive an indication of a communication link to be used by the first UE for transmitting signaling via the RIS. That is, a first configuration of the RIS may be associated with sidelink communications and a second configuration of the RIS may be associated with uplink communications. Accordingly, the RIS may receive, from the first UE or a network entity, an indication of the communication link to be used by the first UE and may apply a respective configuration based on indication.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for TPC with RISs.

FIG. 1 shows an example of a wireless communications system 100 that supports techniques for TPC with RISs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for TPC with RISs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support transmissions via RISs and, as such, may support techniques for a first UE 115 determining power controls to apply to a transmission to the second UE 115 or a network entity 105 in the presence of one or more RISs. That is, the first UE 115 may select a power control configuration from a set of power control configurations for a transmission based on a communication state of the first UE 115. For example, the first UE 115 may receive, from a network entity 105, an indication of multiple power control configurations, where each power control configuration indicates one or more parameters associated with calculating a transmission power for a transmission by the first UE 115. Additionally, each power control configuration may be associated with a communication state of the first UE 115 from a set of communication states, where each communication state is based on a communication link to be used by the first UE 115, a presence of one or more RISs within proximity to the first UE 115, and whether the one or more RISs are assisting the first UE

115 or a second UE 115. As such, the first UE 115 may identify a communication state of the first UE 115 (e.g., from the set of communication states) and select a power control configuration from the multiple power control configuration based on the identified communication state. Additionally, the first UE 115 may perform a transmission in accordance with the selected power control configuration. In other words, the first UE 115 may transmit one or more signals using a calculated transmission power based on the one or more parameters indicated via the selected power control configuration.

Figure 2:
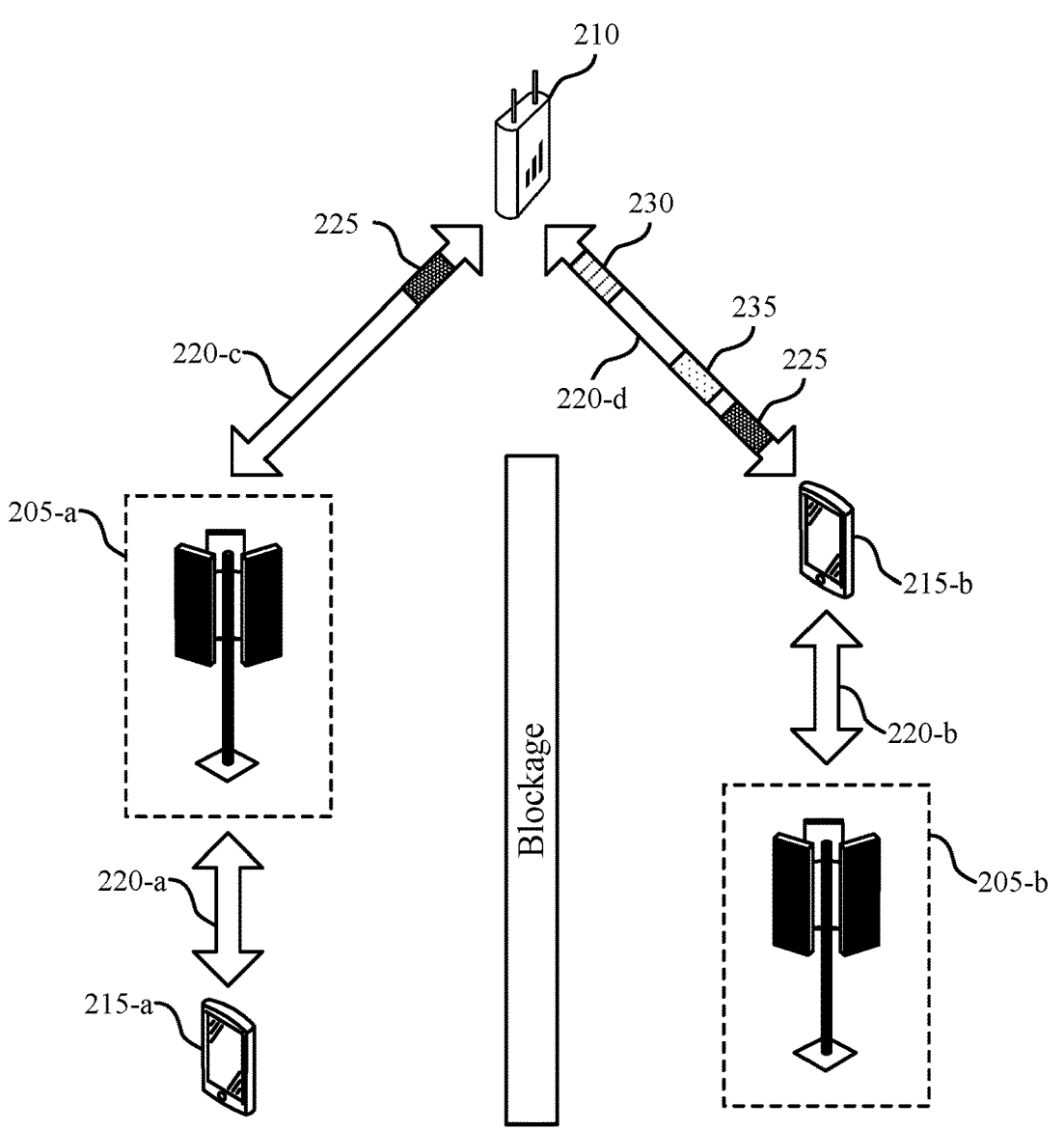
FIG. 2 shows an example of a wireless communications system that supports techniques for TPC with RISs in accordance with one or more aspects of the present disclosure.

Additionally, to enable sidelink and uplink communications via an RIS, the RIS may receive an indication of a communication link to be used by the first UE 115 for transmitting signaling via the RIS. That is, a first configuration of the RIS may be associated with sidelink communications and a second configuration of the RIS may be associated with uplink communications. Accordingly, the RIS may receive, from the first UE 115 or a network entity 105, an indication of the communication link to be used by the first UE 115 and may apply a respective configuration based on indication FIG. 2 shows an example of a wireless communications system 200 that supports techniques for TPC with RISs in accordance with one or more aspects of the present disclosure. The wireless communications system 200 may implement or be implemented by aspects of the wireless communications system 100. For example, the wireless communications system 200 may include one or more network entities 205 (e.g., a network entity 205-*a* and a network entity 205-*b*) and one or more UEs 215 (e.g., a UE 215-*a* and a UE 215-*b*), which may represent examples of corresponding devices as described with reference to FIG. 1. In some examples, the UE 215-*a*, the UE 215-*b*, or both, may implement power controls based on a presence of an RIS 210.

Some wireless communications systems, such as the wireless communications system 200, may support one or more RISs 210. That is, a network entity 205, such as the network entity 205-*a*, may transmit, receive, or both, communications via the RIS 210 to extend a coverage area of the network entity 205-*a* (e.g., with negligible power consumption). For example, the network entity 205-*a* may communicate with the UE 215-*a* via a communication link 220-*a* and the network entity 205-*b* may communicate with the UE 215-*b* via a communication link 220-*b*. In some cases, the network entity 205-*a* may attempt to communicate with the UE 215-*b*, however, a blockage may exist between the network entity 205-*a* and the UE 215-*b*. In other words, the network entity 205-*a* may be unable to communicate directly with the UE 215-*b*. As such, the network entity 205-*a* may communicate with the UE 215-*b* via the RIS 210 (e.g., a near passive wireless device). In other words, the network entity 205-*a* may transmit downlink communications (e.g., signaling) to the RIS 210 via a communication link 220-*c* and the RIS 210 may reflect (e.g., forward) the downlink communications (e.g., impinging wave) to the UE 215-*b* via the communication link 220-*d* (e.g., to a desired direction). In such cases, the network entity 205-*a* may indicate, to the RIS 210, a direction at which to reflect the downlink communications (e.g., reflection direction may be controlled by the network entity 205-*a*).

In some examples, presence of the RIS 210 (e.g., using, or communicating via, the RIS 210 or being located within a threshold proximity of the RIS 210) may impact one or more characteristics associated with an uplink communication link, a sidelink communication link, or both. For example, presence of the RIS 210 may impact pathloss, interference, or both, associated with the uplink communication link, the sidelink communication link, or both. As such, the UE 215-*a*, the UE 215-*b*, or both, may experience degradation of communications based on the presence of the RIS 210 (e.g., the UE 215-*a* communicating via the RIS 210, the UE 215-*b* being located within a proximity threshold of the RIS 210).

Accordingly, techniques described herein may enable a UE 215, such as the UE 215-*a*, the UE 215-*b*, or both, to apply different power controls (e.g., a power control configuration, a set of power control parameters) based on a communication state of the respective UE 215, where each communication state is based on presence, use (e.g., communication via), or both, of one or more RIS 210. In other words, a UE 215 may apply power controls based on if one or more RISs 210 are present (e.g., within a threshold proximity of the UE 215), whether the one or more RISs 210 are assisting (e.g., helping, communicating with) the UE 215 (e.g., transmitter device) or an additional UE 215, which of the one or more RISs 210 are assisting the UE 215 (e.g., if multiple RISs 210 are present), or any combination thereof.

For example, a UE 215, such as the UE 215-*a*, the UE 215-*b*, or both, may receive a control message 225 (e.g., RRC message) indicating multiple power control configurations, where each power control configuration is associated with a communication state of the respective UE 215 (e.g., from multiple communication states). That is, each power control configuration may indicate a set of parameters associated with power control at the UE 215, such that each set of parameters is further associated with a respective communication state. As such, the UE 215 may apply a set of parameters associated with a power control configuration to transmission of one or more communications (e.g., uplink or sidelink) based on the UE 215 operating according to a communication state associated with the power control configuration. Additionally, the control message 225 may include an indication of the associations between the multiple power control configurations and the multiple communication states.

In some cases (e.g., a single RIS 210 may be present), each communication state may be based on a communication link (e.g., uplink or sidelink), whether an RIS 210 (e.g., within a threshold proximity of the respective UE 215) is on or off, whether the RIS 210 (e.g., if on) is assisting the respective UE 215 or an additional UE 215, or any combination thereof. In other words, each power control configuration (e.g., set of parameters) may be associated with a communication link (e.g., sidelink or uplink), whether an RIS 210 is on or off (e.g., presence of the RIS 210 or not), and a usage of the RIS 210 (e.g., whether or not a UE 215 is communicating via the RIS 210).

For example, as depicted in Table 1 below, a UE 215, such as the UE 215-*b*, may receive a control message 225 (e.g., from the network entity 205-*a*, directly or indirectly via the RIS 210, or from the network entity 205-*b*) indicating 6 communication states.

TABLE 1

| Communication States | | | |
| --- | --- | --- | --- |
| State | Communication Link | RIS Presence | RIS Usage |
| State 5 (000 or 001) | Uu | Not Present | N/A |
| State 1 | Uu | Present | Assisting |

TABLE 1-continued

| Communication States | | | |
| --- | --- | --- | --- |
| State | Communication Link | RIS Presence | RIS Usage |
| (010) | | | Additional UE 215 |
| State 2 (011) | Uu | Present | Assisting Transmitting UE 215 |
| State 6 (100 or 101) | Sidelink | Not Present | N/A |
| State 4 (110) | Sidelink | Present | Assisting Additional UE 215 |
| State 3 (111) | Sidelink | Present | Assisting Transmitting UE 215 |

A first communication state may be associated with the UE 215-*b* communicating via a Uu communication link (e.g., uplink communication link), an RIS 210 being present (e.g., within a threshold proximity of the UE 215-*b*), and the RIS 210 assisting an additional UE 215, while a second communication state may be associated with the UE 215-*b* communicating via a Uu communication link, an RIS 210 being present, and the RIS 210 assisting the UE 215-*b*. Conversely, a fifth communication state may be associated with the UE 215-*b* communicating via a Uu communication link and an RIS 210 not being present (e.g., not being within the threshold proximity of the UE 215-*b*).

Similarly, a third communication state may be associated with the UE 215-*b* communicating via a sidelink (SL) communication link, an RIS 210 being present, and the RIS 210 assisting the UE 215-*b*, while a fourth communication state may be associated with the UE 215-*b* communicating via a sidelink communication link, an RIS 210 being present, and the RIS 210 assisting an additional UE 215. Conversely, a sixth communication state may be associated with the UE 215-*b* communicating via a sidelink communication link and an RIS 210 not being present.

As such, a UE 215, such as the UE 215-*b*, which may be a transmitting UE 215, may determine whether an RIS 210 is assisting the UE 215-*b* or another UE 215 to determine a communication state of the UE 215-*b*. In some cases, the UE 215-*b* may determine whether the RIS 210 is assisting the UE 215-*b* or another UE 215 based on an RIS reservation. That is, the UE 215-*b* may transmit a reservation request 230 to the RIS 210 and may receive a reservation confirmation 235 from the RIS 210, confirming that the RIS 210 may assist the UE 215-*b*. Conversely, the UE 215-*b* may refrain from transmitting the reservation request 230 or may transmit the reservation request 230 to the RIS 210 and fail to receive a reservation confirmation 235 from the RIS 210, confirming that the RIS 210 is not assisting the UE 215-*b* (e.g., and is assisting the other UE 215). Additionally, or alternatively, a network entity 205, a controlling sidelink unit, or the like thereof, may transmit, to the UE 215-*b*, an indication of whether the RIS 210 is assisting the UE 215 or another UE 215.

As depicted in FIG. 2, the UE 215-*b* may select the second communication state for uplink communications to the network entity 205-*a* based on the communication link 220-*c* and the communication link 220-*d* being a Uu communication link, the RIS 210 being present (e.g., within the threshold proximity of the UE 215-*b*), and the UE 215-*b* communicating via the RIS 210 (e.g., the RIS 210 assists the UE 215-*b*).

Conversely, the UE 215-a may select the first communication state or the fifth communication state (e.g., depending on a proximity of the UE 215-a to the RIS 210). For example, the UE 215-a may be outside of (e.g., exceed) a threshold proximity of the RIS 210 and may select the first communication state based on the communication link 220-a being a Uu communication link and the RIS 210 not being present (e.g., not being within the threshold proximity of the UE 215-a). Alternatively, the UE 215-a may be within (e.g., may satisfy) the threshold proximity of the RIS 210 and may select the fifth communication state based on the communication link 220-a being a Uu communication link, the RIS 210 being present, and the RIS 210 assisting the UE 215-a (e.g., assisting another UE 215).

Additionally, as discussed previously, each communication state may be associated with a different power control configuration. For example, the first communication state may be associated with a first power control configuration (e.g., first set of parameters), the second communication state may be associated with a second power control configuration (e.g., second set of parameters), the third communication state may be associated with a third power control configuration (e.g., third set of parameters), the fourth communication state may be associated with a fourth power control configuration (e.g., fourth set of parameters), the fifth communication state may be associated with a fifth power control configuration (e.g., fifth set of parameters, legacy Uu power controls), and the sixth communication state may be associated with a sixth power control configuration (e.g., sixth set of parameters, legacy sidelink power controls).

For example, (e.g., in sidelink communications), a UE 215 may maintain (e.g., be configured to maintain) a nominal transmit power, $P_{O,D}$, for each resource block. As such, the UE 215 may subtract a gain, $G_n$, associated with an RIS 210 based on a communication state of the UE 215, where the gain is indicated via a power control configuration associated with the communication state of the UE 215. For example, a power (e.g., transmit power, transmission power) for a sidelink shared channel (PSSCH) transmission, $P_{PSSCH, D}(i)$, may be calculated according to the following Equation 1:

$$P_{PSSCH,D}(i) = P_{O,D} + 10\log_{10}\left(2^{\mu} \cdot M_{RB}^{PSSCH}(i)\right) + \alpha_D \cdot PL_D[\text{dBM}] - G_n \quad (1)$$

where $$M_{RB}^{PSSCH}(i)$$

(i) may represent a bandwidth of a PSCCH resource assignment expressed in a quantity of resource blocks (RBs) for a PSSCH transmission occasion, i, where $\alpha_D$ may represent an indicated variable, where $PL_D$ may represent a downlink pathloss estimate (e.g., in decibel-milliwatts), and, as described previously, $G_n$, may be a gain associated with an RIS 210 based on a communication state of the UE 215. For example, $G_1$ (e.g., network entity 205 receive) may be associated with the first communication state of the UE 215, $G_2$ (e.g., $G_1 \leq G_2$ since RIS 210 is not helping the UE 215) may be associated with the second communication state of the UE 215, $G_3$ (e.g., sidelink UE 215 receiver that is an intended received of a transmitter UE 215) may be associated with the third communication state of the UE 215, $G_4$ (e.g., sidelink UE 215 receiver that is different from the sidelink UE 215 receiver of the transmitter UE 215) may be associated with the fourth communication state of the UE 215, $G_5$ (e.g., 0) may be associated with the fifth communication state of the UE 215, and $G_6$ (e.g., 0) may be associated with the sixth communication state of the UE 215

As such (e.g., at a given time), a UE 215, such as the UE 215-a or the UE 215-b, may be aware of whether an RIS 210 is assisting the UE 215 or not and whether the UE 215 is using uplink, sidelink, or both. As such, the UE 215 may be aware of a communication state of the UE 215 and may apply a respective power control configuration based on the communication state. In other words, the UE 215 may calculate a transmission power for a transmission to be performed by the UE 215 using a set of parameters associated with the respective power control configuration further associated with the communication state of the UE 215.

Additionally, or alternatively, the wireless communications system 200 may be associated with multiple RISs 210 (e.g., not depicted). As such, each UE 215 (e.g., in the wireless communications system 200) may select a power control configuration (e.g., set of parameters associated with power control for one or more uplink transmission) based on a communication link (e.g., uplink or sidelink), a quantity of RISs 210 that are on or off (e.g., presence of RISs 210), which RISs 210 (e.g., of the RISs 210 turned on) are assisting the respective UE 215 or an additional UE 215, RIS 210 identifiers of the RISs 210 that are turned on (e.g., or combination of active RIS 210 identifiers), or any combination thereof. In other words, each communication state may be associated with a communication link, which RISs 210 are on or off, and a usage of the RISs 210 (e.g., whether or not a UE 215 is communicating via one or more of the RISs 210 that are turned on). In such cases, each RIS 210 (e.g., that is turned on) may result in additional gain based on respective RIS configurations (e.g., beamformer configurations). In other words, a UE 215 may implement different power controls in a single RIS 210 scenario versus a multi-RIS 210 scenario.

In some cases, a network entity 205 may be aware of one or more active (e.g., turned on) RISs 210 associated with the UE 215 (e.g., UE 215 is aware of the one or more active RISs 210 based on indication of identifiers associated with the one or more active RISs 210) and one or more communication links associated with the UE 215 (e.g., the network entity 205 may configure sidelink grants, such as Mode 1 resource allocation, uplink grants, or both). As such, the network entity 205 may be aware of a communication state of the UE 215 and may transmit an indication of the communication state to the UE 215, such that the UE 215 may apply a respective power control configuration based on the indicated communication state.

Though described in the context of the RIS 210, this is not to be regarded as a limitation of the present disclosure. In this regard, any wireless device (e.g., wireless node) capable of reflecting (e.g., forwarding) wireless communications between multiple wireless devices, such as the UE 215-a and the network entity 205-a, may be considered with regards to the techniques described herein.

Figure 3:
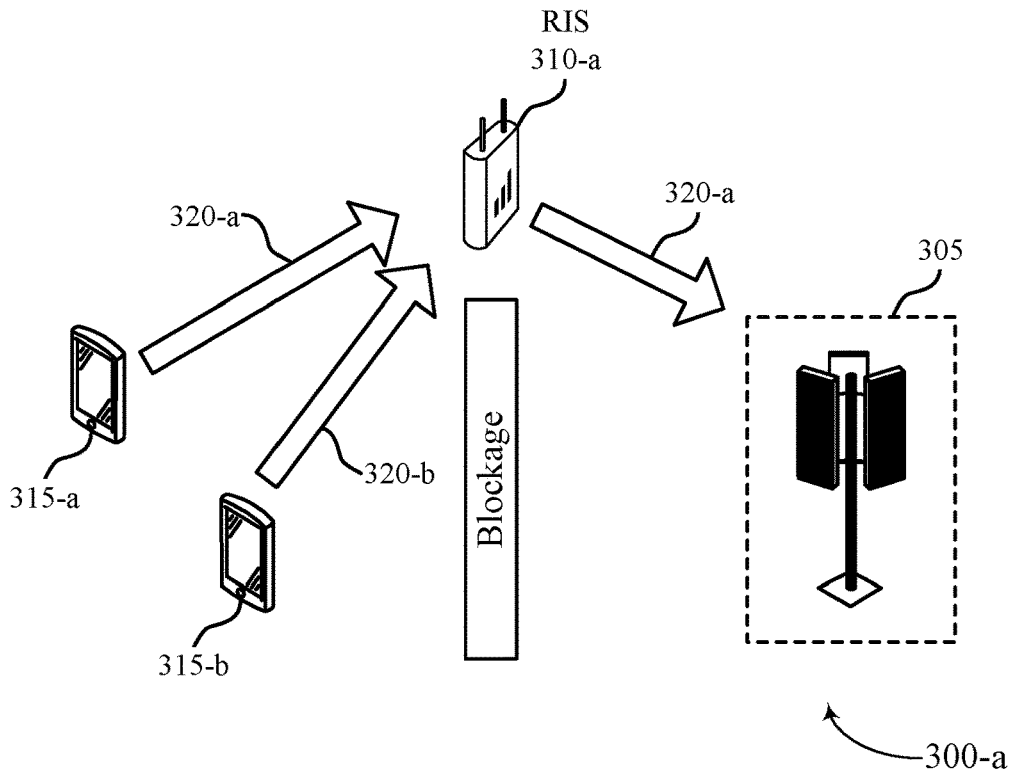
FIG. 3 show examples of wireless communications systems that supports techniques for TPC with RISs in accordance with one or more aspects of the present disclosure.
Figure 3:
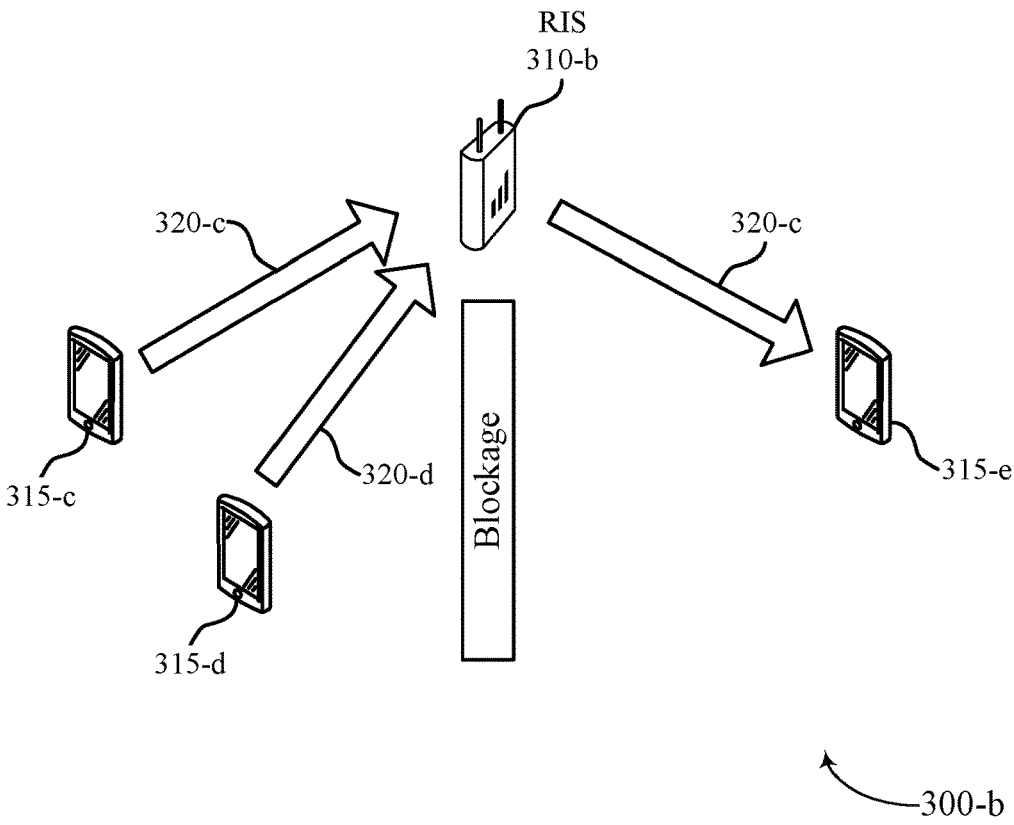

FIG. 3 shows examples of wireless communications systems 300 (e.g., a wireless communications system 300-a and a wireless communications system 300-b) that supports techniques for TPC with RISs in accordance with one or more aspects of the present disclosure. The wireless communications systems 300 may implement or be implemented by aspects of the wireless communications system 100, the wireless communications system 200, or both. For example, each of the wireless communications systems 300 may include one or more network entities 305 and one or more UEs 315 (e.g., a UE 315-*a*, a UE 315-*b*, a UE 315-*c*, a UE 315-*d*, and a UE 315-*e*), which may represent examples of corresponding devices as described with reference to FIG. 1. In some examples, the UEs 315 may implement power controls based on presence of an RIS 310.

As described previously, with reference to FIG. 2, a UE 315 may support multiple communication states and may apply a power control configuration based on a current communication state of the UE 315 (e.g., from the multiple communication states). In other words, a network entity 305 may be unaware of the current communication state of the UE 315 (e.g., since an RIS 310 may be used in a sidelink communications link or an uplink communications link, or may be controlled by a PLC or another unit in sidelink communications). As such, the UE 315 may determine the current communication state of the UE 315 (e.g., its own transmission power for uplink communications or sidelink communications) based on a communication link to be used by the UE 315, a presence of one or more RISs 310, and whether the one or more RISs 310 are assisting the UE 315 or an additional UE 315.

For example, in the wireless communications system 300-*a*, a UE 315-*a* may transmit signaling via a communication link 320-*a* to a network entity 305 via an RIS 310-*a*, where the communication link 320-*a* is an uplink communication link 320-*a*. As such, the UE 315-*a* may communicate according to a first communication state, where the first communication state is based on the UE 315-*a* communicating via the uplink communication link 320-*a*, the RIS 310-*a* being present (e.g., being "on" within a threshold proximity of the UE 315-*a*), and the RIS 310-*a* assisting the UE 315-*a* (e.g., forwarding signaling received from the UE 315-*a*). Accordingly, the UE 315-*a* may transmit the signaling via the communication link 320-*a* in accordance with a first power control configuration associated with the first communication state.

Additionally, a UE 315-*b* may transmit signaling via a communication link 320-*b*, where the communication link 320-*b* is an uplink communication link 320-*b* and where the signaling is not transmitted via the RIS 310-*a*. As such, the UE 315-*b* may communicate according to a second communication state. That is, the second communication state may be based on the UE 315-*b* communicating via the uplink communication link 320-*b*, the RIS 310-*a* being present (e.g., being "on" within the threshold proximity of the UE 315-*b*), and the RIS 310-*a* not assisting the UE 315-*b* (e.g., not forwarding signaling received from the UE 315-*b*), or assisting the UE 315-*a*. Accordingly, the UE 315-*b* may transmit the signaling via the communication link 320-*b* in accordance with a second power control configuration associated with the second communication state.

In another example, in the wireless communications system 300-*b*, a UE 315-*c* may transmit signaling via a communication link 320-*c* to a UE 315-*e* via an RIS 310-*b*, where the communication link 320-*c* is a sidelink communication link 320-*c*. As such, the UE 315-*c* may communicate according to a third communication state, where the third communication state is based on the UE 315-*c* communicating via the sidelink communication link 320-*c*, the RIS 310-*b* being present (e.g., being "on" within the threshold proximity of the UE 315-*c*), and the RIS 310-*b* assisting the UE 315-*c* (e.g., forwarding signaling received from the UE 315-*c*). Accordingly, the UE 315-*c* may transmit the signaling via the communication link 320-*c* in accordance with a third power control configuration associated with the third communication state. Additionally, a UE 315-*d* may transmit signaling via a communication link 320-*d*, where the signaling is not transmitted via the RIS 310-*b*. As such, the UE 315-*d* may communicate according to a fourth communication state. That is, the fourth communication state may be based on the UE 315-*d* communicating via the sidelink communication link 320-*d*, the RIS 310-*b* being present (e.g., being "on" within a threshold proximity of the UE 315-*d*), and the RIS 310-*b* not assisting the UE 315-*d* (e.g., not forwarding signaling received from the UE 315-*d*), or assisting the UE 315-*c*. Accordingly, the UE 315-*d* may transmit the signaling via the communication link 320-*d* in accordance with a fourth power control configuration associated with the fourth communication state.

In some other examples, not depicted in FIG. 3, a UE 315 may not communicate via an RIS 310 and may determine that no RISs 310 are present (e.g., no RISs 310 are "on" within the threshold proximity of the UE 315). In some examples, the UE 315 may communicate via a sidelink communications link and, as such, the UE 315 may communicate according to a fifth communication state, where the fifth communication state is based on the UE 315 communicating via the sidelink communication link and no RISs 310 being present. Accordingly, the UE 315 may transmit signaling in accordance with a fifth power control configuration associated with the fifth communication state. Alternatively, the UE 315 may communicate via an uplink communications link and, as such, the UE 315 communicate according to a sixth communication state, where the sixth communication state is based on the UE 315 communicating via the uplink communication link and no RISs 310 being present. Accordingly, the UE 315 may transmit signaling in accordance with a sixth power control configuration associated with the sixth communication state.

Though described in the context of six communication states, this is not to be regarded as a limitation of the present disclosure. In this regard, any quantity of communication states may be defined and may be associated with any quantity of power control configurations.

Figure 4:
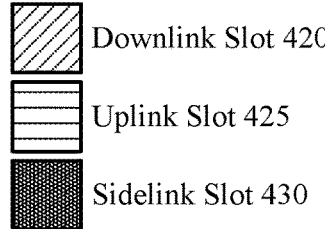
FIG. 4 shows an example of a wireless communications system that supports techniques for TPC with RISs in accordance with one or more aspects of the present disclosure.

FIG. 4 shows an example of a wireless communications system 400 that supports techniques for TPC with RISs in accordance with one or more aspects of the present disclosure. The wireless communications system 400 may implement or be implemented by aspects of the wireless communications system 100, the wireless communications system 200, the wireless communications systems 300, or any combination thereof. For example, the wireless communications system 400 may include one or more network entities 405 and one or more UEs 415 (e.g., a UE 415-*a* and a UE 415-*b*), which may represent examples of corresponding devices as described with reference to FIG. 1. In some examples, the UE 415-*a* may implement power controls based on presence of an RIS 410.

RISs 410 may support communications via downlink communication links, uplink communication links, and sidelink communication links (e.g., among other communication links). As such, a UE 415, such as the UE 415-*a*, may communicate via the RIS 410 during downlink slots 420, uplink slots 425, and sidelink slots 430. In such cases, during a slot in which the RIS 410 is to forward communications from the UE 415-*a* to a second wireless device, such as a UE 415-*b* or a network entity 405, the RIS 410 may either assist the UE 415-*a* on a sidelink communication link for sidelink transmissions or may assist the UE 415-*a* on an uplink communication link for uplink transmissions. In other words, the RIS 410 may forward uplink signaling 435 to the network entity 405 via an uplink slot 425-*a* and an uplink slot 425-*b* or may forward sidelink signaling 440 to the UE 415-*b* via a sidelink slot 430-*a* and a sidelink slot 430-*b*.

In such cases, a configuration of the RIS 410 may be based on a type of transmission to be forwarded by the RIS 410 (e.g., based on a receiver side). For example, a first configuration of the RIS 410 may be associated with the RIS 410 assisting (e.g., forwarding) uplink transmissions (e.g., helping on the uplink communication link) and a second configuration of the RIS may be associated with the RIS 410 assisting sidelink transmissions (e.g., helping on the sidelink communication link). Each configuration may indicate a set of parameters, such as beamforming weight (e.g., φ), for forwarding the respective transmissions. For example, the first configuration may indicate a first beamforming weight (e.g., $\varphi_1$) and the second configuration may indicate a second beamforming weight (e.g., $\varphi_2$). However, the RIS 410 may be unable to change a beamforming weight associated with forwarding a transmission based on the transmission being an uplink transmission or a downlink transmission. In other words, a first beamformer of the RIS 410 may serve uplink communications and a second beamformer of the RIS 410 may serve sidelink communications. As such, the RIS 410 may not be able to assist uplink communications and sidelink communications simultaneously (e.g., at the same time). Thus, due to the ability for a slot in which the RIS 410 is to forward communications from the UE 415-*a* to the second wireless device (e.g., an uplink slot 425 from the view of the RIS 410) to be an uplink slot 425 or a sidelink slot 430, the RIS 410 may not be able to determine the configuration of the RIS 410 for forwarding a transmission from the UE 415-*a*.

Accordingly, techniques described herein may enable the RIS 410 to receive an indication of which configuration (e.g., the first configuration or the second configuration) to apply to the RIS 410 for forwarding a transmission from the UE 415-*a*. For example, the network entity 405 may transmit a control message 445-*a* (e.g., downlink control information (DCI), level 1, level 2, or level 3 signaling) indicating for the RIS 410 to use the first configuration or the second configuration for a slot in which the RIS 410 is to forward communications from the UE 415-*a* (e.g., when uplink slots 425 overlap with sidelink slots 430). In some examples, the control message 445-*a* may indicate a communication link to be used by the UE 415-*a* (e.g., uplink communication link or sidelink communication link), a type of signaling to be transmitted by the UE 415-*a* (e.g., uplink signaling 435 or sidelink signaling 440), a configuration to be applied by the RIS 410 (e.g., the first configuration or the second configuration), or any combination thereof.

Additionally, or alternatively, the UE 415-*a* may transmit a control message 445-*b* (e.g., via level 1 or level 2 signaling) indicating for the RIS 410 to use the first configuration or the second configuration for a slot in which the RIS 410 is to forward communications from the UE 415-*a*. Similar to the control message 445-*a*, the control message 445-*b* may indicate a communication link to be used by the UE 415-*a* (e.g., uplink communication link or sidelink communication link), a type of signaling to be transmitted by the UE 415-*a*, a configuration to be applied by the RIS 410, or any combination thereof.

Though described in the context of a first configuration associated with uplink communications and a second configuration associated with sidelink communications, this is not to be regarded as a limitation of the present disclosure. That is, any quantity of configurations may be associated with the RIS 410 and any quantity of configurations may be associated with a type of communication (e.g., sidelink, uplink, downlink). Additionally, or alternatively though not depicted in FIG. 4, the configuration of the RIS 410 may also be based on a type of transmission to be received by the RIS 410 (e.g., based on a transmitter side, which may be fixed in the context of FIG. 4).

Figure 5:
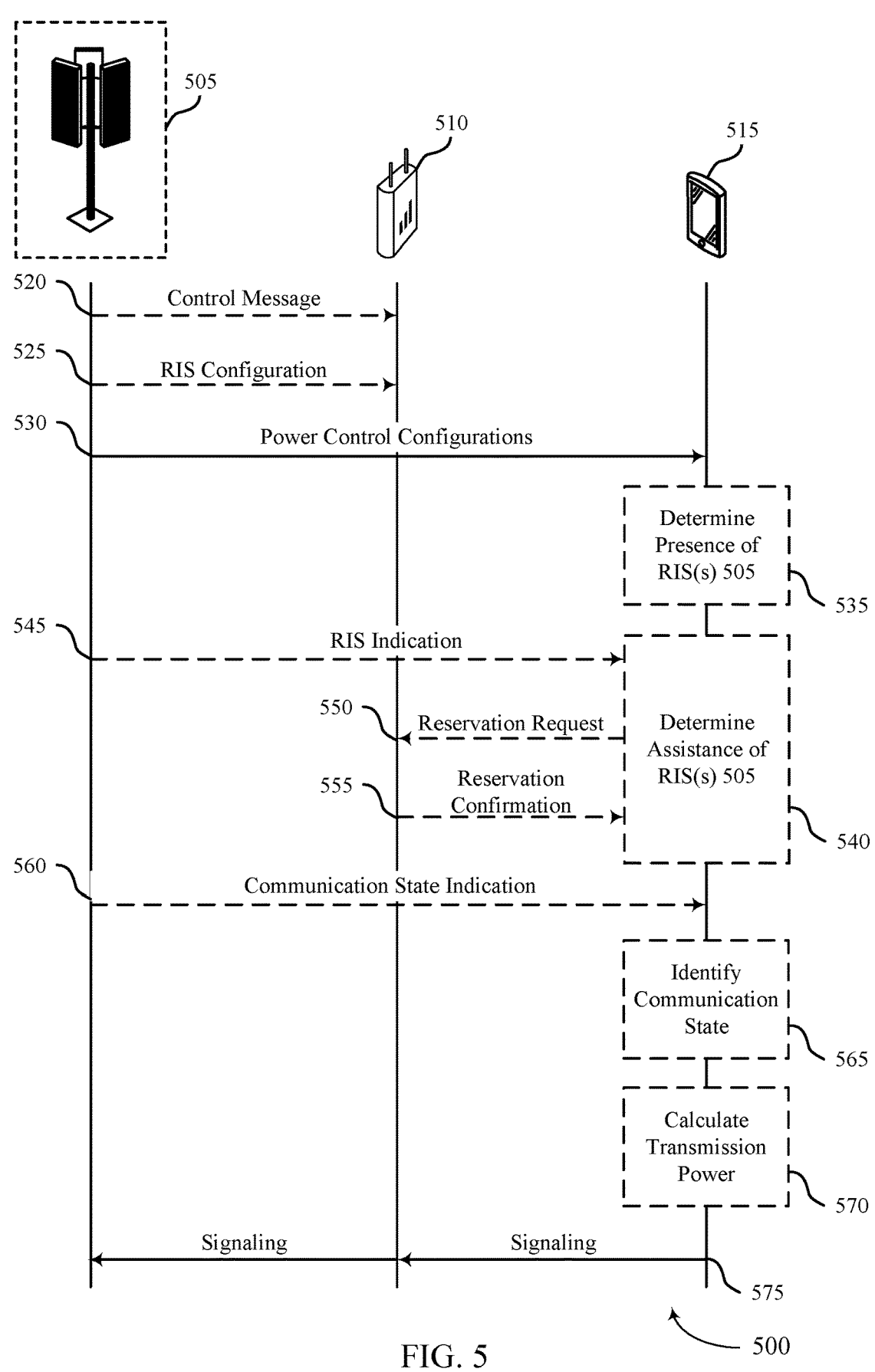
FIG. 5 shows an example of a process flow that supports techniques for TPC with RISs in accordance with one or more aspects of the present disclosure.

FIG. 5 shows an example of a process flow 500 that supports techniques for TPC with RISs in accordance with one or more aspects of the present disclosure. The process flow 500 may implement or be implemented by aspects of the wireless communications system 100, the wireless communications system 200, the wireless communications systems 300, the wireless communications system 400, or any combination thereof. For example, the process flow 500 may include one or more network entities 505 and one or more UEs 115, which may represent examples of corresponding devices as described with reference to FIG. 1. In some examples, the UE 515 may implement power controls based on presence of an RIS 510.

In some examples, at 520, the RIS 510 may receive, from a network entity 505, a first control message indicating multiple RIS configurations, where each RIS configuration is associated with a type of communication link from multiple types of communication links. The multiple types of communication links may include at least a sidelink communication link and an uplink communication link. Each RIS configuration of the multiple RIS configurations may be associated with a set of parameters, such as a beamforming weight. That is, the RIS 510 may forward transmissions from the UE 515 in accordance with a set of parameters associated with a current RIS configuration of the RIS 510.

In some examples, at 525, the RIS 510 may receive, from the network entity 505 or the UE 515 (e.g., not depicted), a second control message indicating a first RIS configuration of the multiple RIS configurations to be applied by the RIS 510 for forwarding communications (e.g., assisting the UE 515). The indication of the first RIS configuration may include an explicit indication of the first RIS configuration, an index associated with the RIS configuration, an indication of a communication link to be used by the UE 515 (e.g., associated with the first RIS configuration), an indication of a type of signaling to be transmitted by the UE 515 (e.g., associated with the first RIS configuration), or any combination thereof.

At 530, the UE 515 may receive, from the network entity 505 (e.g., directly or via the RIS 510), a control message indicating multiple power control configurations, where each power control configuration indicates (e.g., is associated with) a respective parameter set associated with calculating a transmission power for a transmission by the UE 515. In some examples, each parameter set may include a parameter associated with an elemental antenna gain. Each power control configuration from the multiple power control configurations may be associated with a respective communication state (e.g., of the UE 515) from multiple communication states. Each communication state may be associated with a communication link, a presence of one or more RISs 510 (e.g., a presence of one or more "on" RISs 510 within a threshold proximity of the UE 515), and whether the one or more RISs 510 are assisting the UE 515 or another UE 115. In other words, each power control configuration of the multiple power control configurations is associated with a communication link, a presence of one or more RISs 510, and whether the one or more RISs 510 are assisting the UE 515 or another UE 115 (e.g., based on the respective communication state). Additionally, or alternatively (e.g., when multiple RISs 510 are present), each power control configuration may be associated with one or more RIS identifiers, one or more combinations of RIS identifiers, or both, associated with the one or more RISs 510.

In some examples, at 535, the UE 515 may determine whether one or more RISs 510 are present within the threshold proximity of the UE 515. That is, the UE 515 may be capable of determining whether one or more RISs 510 located within the threshold proximity of the UE 515 are "on" or "off." In some examples, the UE 515 may determine that no RISs 510 are within the threshold proximity of the UE 515 (e.g., no RISs 510 are "on" within the threshold proximity of the UE 515).

In some other examples, the UE 515 may determine one or more RISs 510 are within the threshold proximity of the UE 515 and, at 540, may determine whether the one or more RISs 510 are assisting the UE 515 or the other UE 115. In some examples, the UE 515 may determine the one or more RISs 510 are assisting the UE 515 based on an indication from the network entity 505. That is, in some cases, at 545, the network entity 505 may transmit, to the UE 515 an indication of whether the UE 515 or the other UE 115 are communicating with the network entity via the one or more RISs 510 (e.g., indication of whether the one or more RISs 510 are assisting the UE 515 or the other UE 115).

Additionally, or alternatively, the UE 515 may determine the one or more RISs 510 are assisting the UE 515 based on receipt of a reservation confirmation from the one or more RISs 510. That is, at 550, the UE 515 may transmit a reservation message to the one or more RISs 510 requesting the one or more RISs 510 assist the UE 515 (e.g., forward communications to/from the UE 515). As such, the UE 515 may determine the one or more RISs 510 are assisting the UE 515 (e.g., forwarding communications between the UE 515 and the network entity 505) based on receiving, at 555, a reservation confirmation (e.g., confirmation message) responsive to the reservation message.

In some cases, at 560, the UE 515 may receive, from the network entity 505 (e.g., directly or via the RIS 510), an indication of a first communication state from the multiple communication states.

In some examples, at 565, the UE 515 may identify the first communication state of the multiple communication states. In some examples, the UE 515 may identify the first communication state of the multiple communication states based on the indication from the network entity 505. In some other examples, the UE 515 may identify (e.g., determine) the first communication state of the multiple communication states based on a communication link associated with a transmission of signaling (e.g., to be performed by the UE 515), a presence of one or more RISs 510 during the transmission, and whether the one or more wireless nodes are assisting the UE 515 or the other UE 115.

In some examples, at 570, the UE 515 may calculate the transmission power for transmitting the signaling based on a first parameter set associated with a first power control configuration further associated with the first communication state. As such, at 575, the UE 515 may transmit the signaling in accordance with the calculated transmission power based on the first parameter set associated with first power control configuration (e.g., further associated with the first communication state).

Though described in the context of the UE 515 communicating with the network entity 505 via the RIS 510, this is not to be regarded as a limitation of the present disclosure. In this regard, the UE 515 may communicate in accordance with any communication state described herein, including, but not limited to, communications with an additional UE 115 via the RIS 510, with the additional UE 115 not via the RIS 510 but within a threshold proximity of the RIS 510, with the additional UE 115 not via the RIS 510 and outside of the threshold proximity of the RIS 510, with an additional network entity 505 not via the RIS 510 but within a threshold proximity of the RIS 510, with the additional network entity 505 not via the RIS 510 and outside of the threshold proximity of the RIS 510, or any combination thereof. Additionally, or alternatively, any quantity of RISs 510 may be considered with regards to the techniques described herein.

Figure 6:
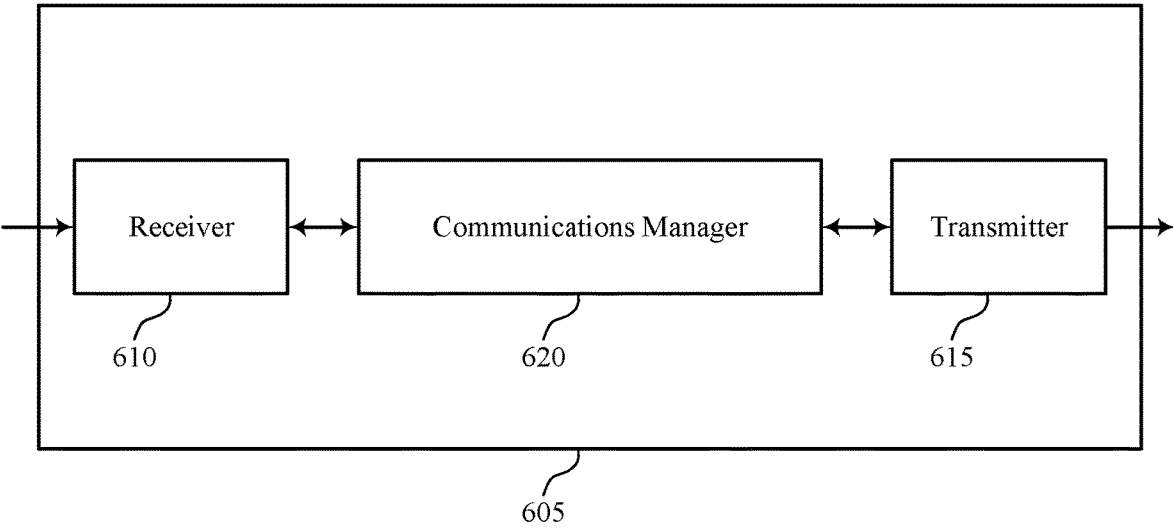
FIGS. 6 and 7 show block diagrams of devices that support techniques for TPC with RISs in accordance with one or more aspects of the present disclosure.

FIG. 6 shows a block diagram 600 of a device 605 that supports techniques for TPC with RISs in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for TPC with RISs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for TPC with RISs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for TPC with RISs as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 is capable of, configured to, or operable to support a means for receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE. The communications manager 620 is capable of, configured to, or operable to support a means for transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for TPC with RISs which may result in reduced processing, reduced power consumption, and more efficient utilization of communication resources, among other advantages.

Figure 7:
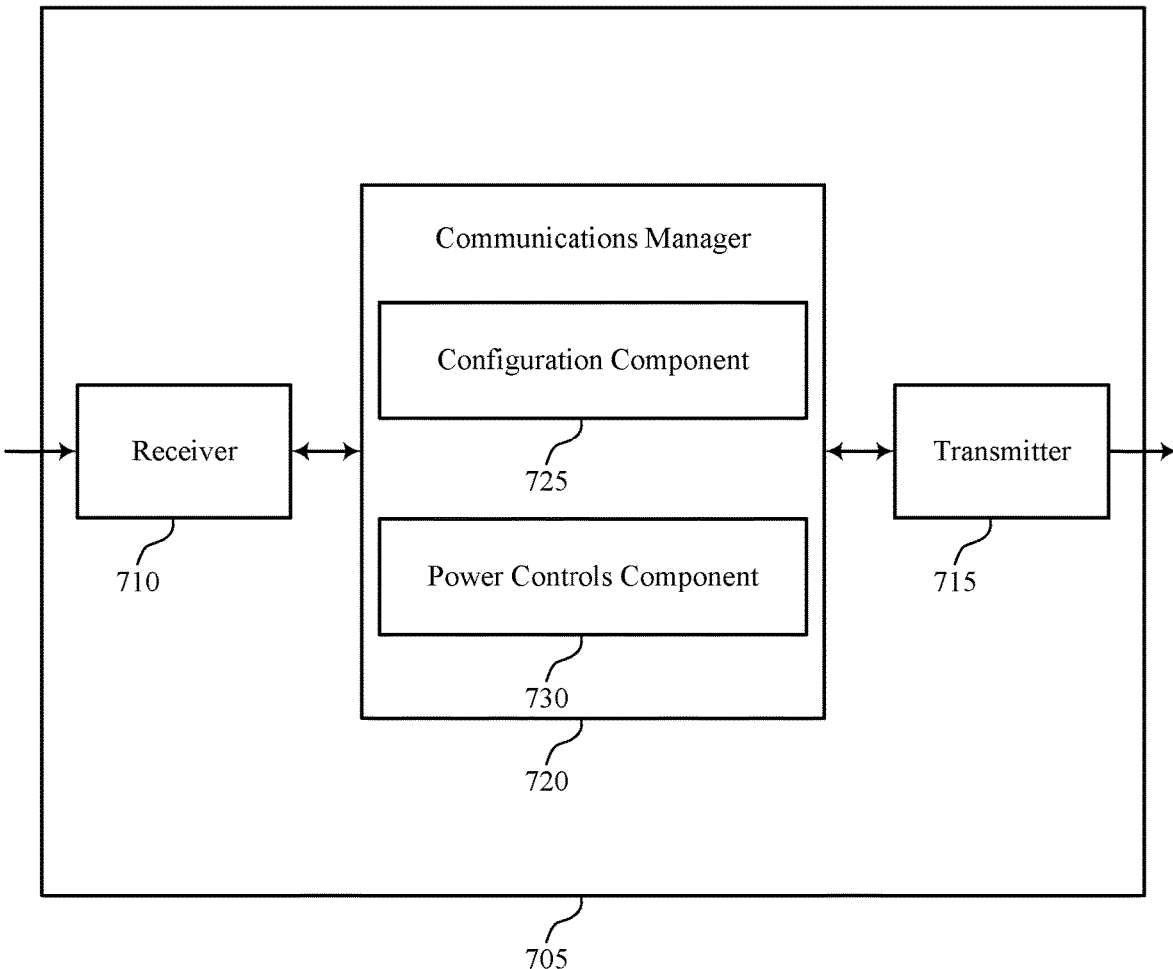

FIG. 7 shows a block diagram 700 of a device 705 that supports techniques for TPC with RISs in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for TPC with RISs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for TPC with RISs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for TPC with RISs as described herein. For example, the communications manager 720 may include a configuration component 725 a power controls component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The configuration component 725 is capable of, configured to, or operable to support a means for receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE. The power controls component 730 is capable of, configured to, or operable to support a means for transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

Figure 8:
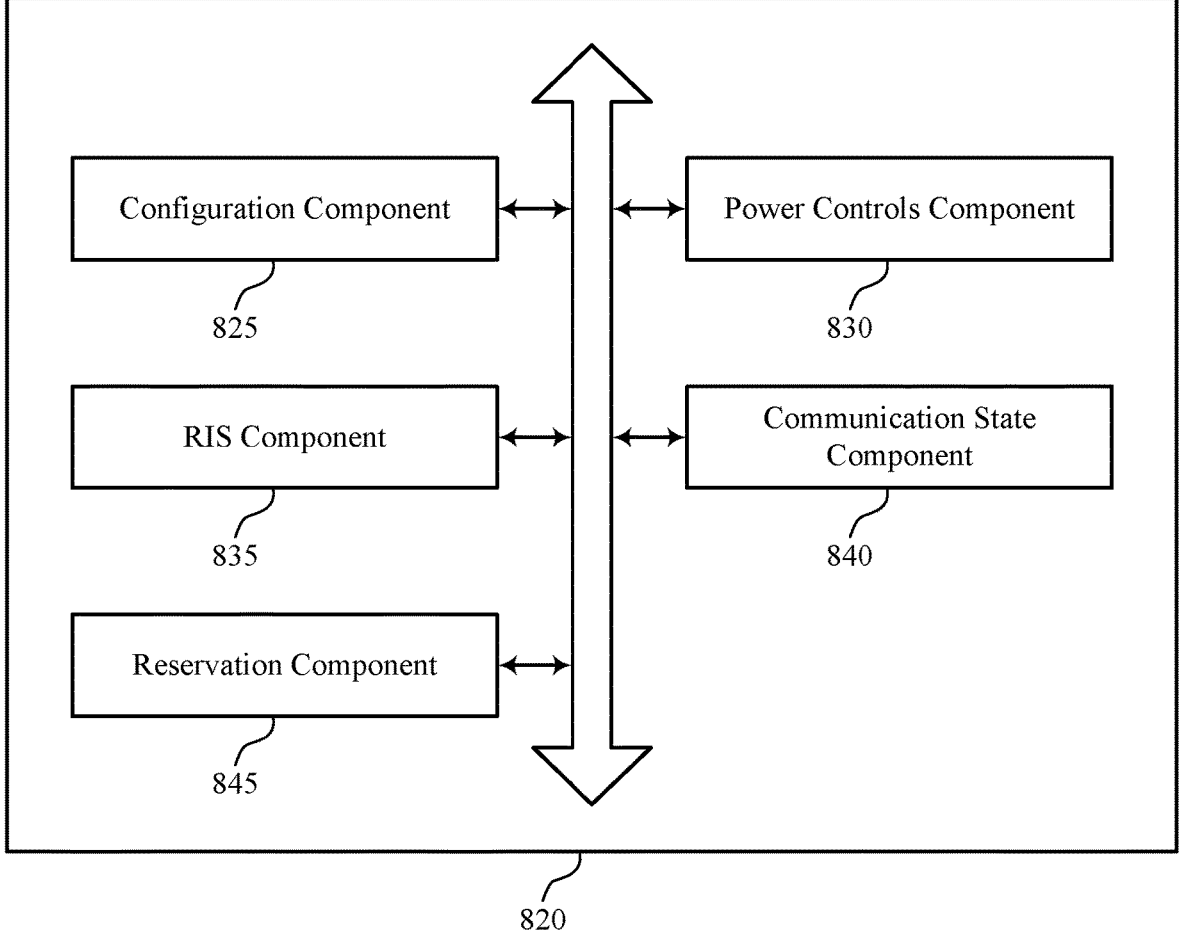
FIG. 8 shows a block diagram of a communications manager that supports techniques for TPC with RISs in accordance with one or more aspects of the present disclosure.

FIG. 8 shows a block diagram 800 of a communications manager 820 that supports techniques for TPC with RISs in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for TPC with RISs as described herein. For example, the communications manager 820 may include a configuration component 825, a power controls component 830, a RIS component 835, a communication state component 840, a reservation component 845, or any combination thereof. Each of these components, or components or subcomponents thereof (e.g., one or more processors, one or more memories), may communicate, directly or indirectly, with one another (e.g., via one or more buses).

The communications manager 820 may support wireless communications at a first UE in accordance with examples as disclosed herein. The configuration component 825 is capable of, configured to, or operable to support a means for receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE. The power controls component 830 is capable of, configured to, or operable to support a means for transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

In some examples, the RIS component 835 is capable of, configured to, or operable to support a means for determining the one or more wireless nodes are present within a threshold proximity of the UE, where the first parameter set is associated with the one or more wireless nodes being present.

In some examples, the RIS component 835 is capable of, configured to, or operable to support a means for determining whether the one or more wireless nodes are assisting the first UE or the second UE, where selecting the first parameter set is based on the determining.

In some examples, to support determining whether the one or more wireless nodes are assisting the first UE or the second UE, the RIS component 835 is capable of, configured to, or operable to support a means for receiving an indication of whether the first UE or the second UE, are communicating with the network entity via the one or more wireless nodes.

In some examples, to support determining whether the one or more wireless nodes are assisting the first UE or the second UE, the reservation component 845 is capable of, configured to, or operable to support a means for transmitting a reservation message to the one or more wireless nodes, where determining whether the first UE is communicating with the network entity via the one or more wireless nodes is based on receiving a confirmation message responsive to the reservation message.

In some examples, the first parameter set is associated with one or more wireless node identifiers associated with the one or more wireless nodes.

In some examples, the configuration component 825 is capable of, configured to, or operable to support a means for transmitting, to the one or more wireless nodes, a control message indicating a set of multiple parameters associated with a set of multiple communication links including at least the communication link associated with the transmission by the first UE.

In some examples, the RIS component 835 is capable of, configured to, or operable to support a means for determining the one or more wireless nodes are not present within a threshold proximity of the UE, where the first parameter set is associated with the one or more wireless nodes not being present.

In some examples, the communication state component 840 is capable of, configured to, or operable to support a means for identifying a first communication state from a set of multiple communication states based on the communication link associated with the transmission of the signaling, the presence of the one or more wireless nodes during the transmission, and whether the one or more wireless nodes are assisting the first UE or the second UE, where the first set of parameters is associated with the first communication state.

In some examples, the communication state component 840 is capable of, configured to, or operable to support a means for receiving, from the network entity, an indication of the first communication state from the set of multiple communication states, where applying the first parameter set is based on receiving the indication.

In some examples, each communication state of the set of multiple communication states is associated with the communication link, the presence of one or more wireless nodes, and whether the one or more wireless nodes are assisting the first UE or a second UE.

In some examples, the power controls component 830 is capable of, configured to, or operable to support a means for calculating the transmission power for the transmission of the signaling based on the first parameter set.

In some examples, each parameter set of the set of multiple parameter sets includes a first parameter associated with an elemental antenna gain.

In some examples, the communication link includes a sidelink communication link or an uplink communication link.

In some examples, the one or more wireless nodes include one or more RISs.

Figure 9:
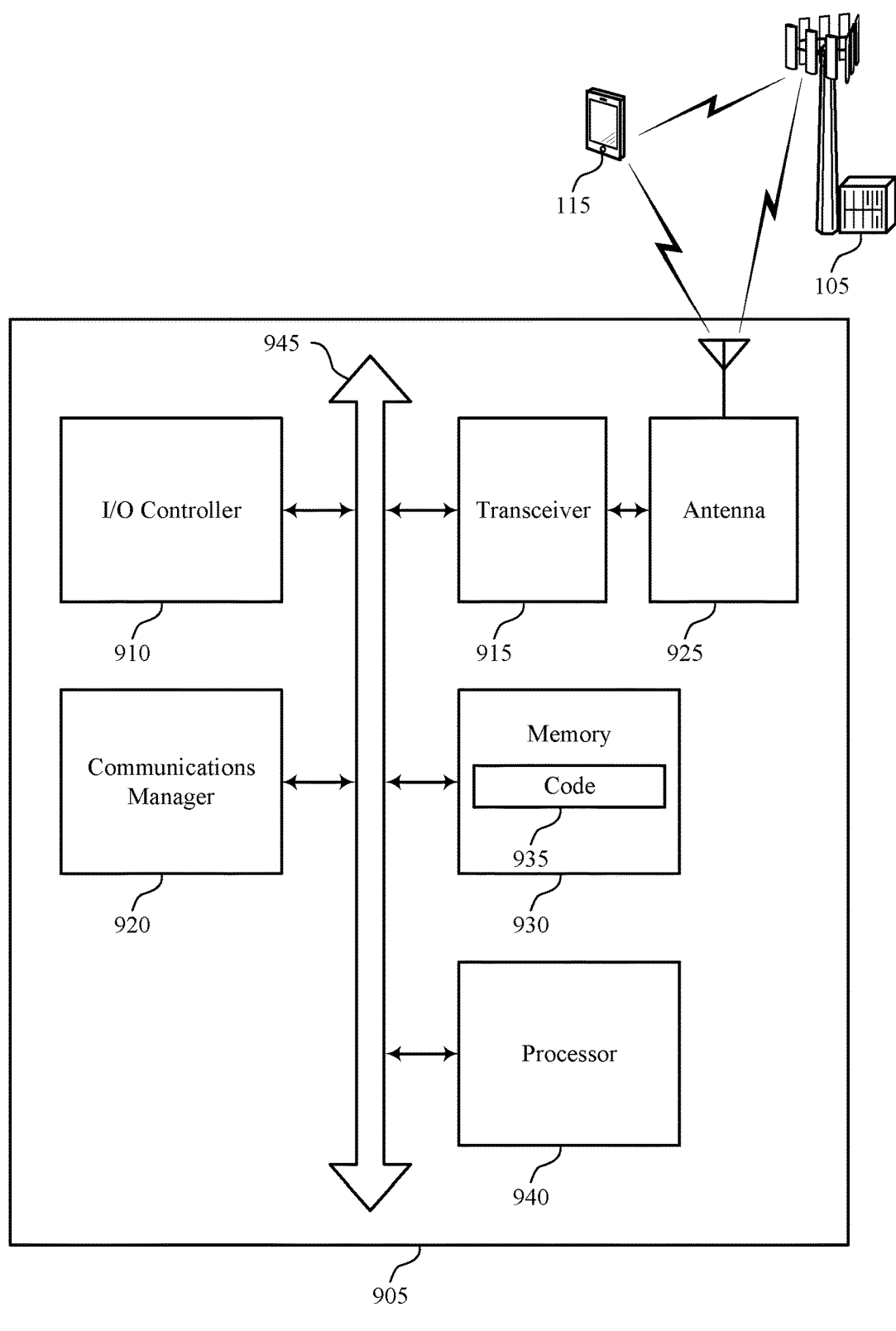
FIG. 9 shows a diagram of a system including a device that supports techniques for TPC with RISs in accordance with one or more aspects of the present disclosure.

FIG. 9 shows a diagram of a system 900 including a device 905 that supports techniques for TPC with RISs in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for TPC with RISs). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 is capable of, configured to, or operable to support a means for receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE. The communications manager 920 is capable of, configured to, or operable to support a means for transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE.

By including or configuring the communications manager 920 in accordance with examples as described herein, the device 905 may support techniques for TPC with RISs which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for TPC with RISs as described herein, or the processor 940 and the memory 930 may be otherwise configured to perform or support such operations.

Figure 10:
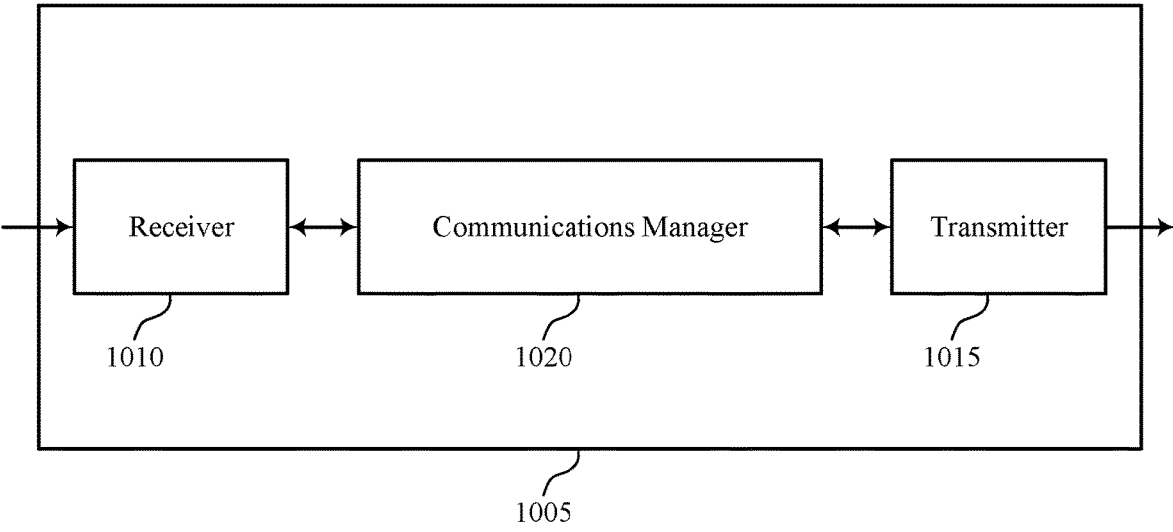
FIGS. 10 and 11 show block diagrams of devices that support techniques for TPC with RISs in accordance with one or more aspects of the present disclosure.

FIG. 10 shows a block diagram 1000 of a device 1005 that supports techniques for TPC with RISs in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for TPC with RISs as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE. The communications manager 1020 is capable of, configured to, or operable to support a means for transmitting, to the first UE, an indication of a first communication state from a set of multiple communication states, where the first communication state is associated with a first parameter set of the set of multiple parameter sets. The communications manager 1020 is capable of, configured to, or operable to support a means for communicating with the first UE based on transmitting the indication of the first communication state.

Additionally, or alternatively, the communications manager 1020 may support wireless communications at a wireless node in accordance with examples as disclosed herein. For example, the communications manager 1020 is capable of, configured to, or operable to support a means for receiving, from a network entity, a control message indicating a set of multiple parameters associated with a set of multiple communication links, the set of multiple communication links including at least a sidelink communication link and an uplink communication link. The communications manager 1020 is capable of, configured to, or operable to support a means for receiving a second control message indicating a communication link of the set of multiple communication links to be used by a UE for transmitting signaling. The communications manager 1020 is capable of, configured to, or operable to support a means for receiving, from the UE, the signaling via the communication link from the set of multiple communication links. The communications manager 1020 is capable of, configured to, or operable to support a means for forwarding the signaling to a network entity or a second UE based on the parameters associated with the communication link.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for TPC with RISs which may result in reduced processing, reduced power consumption, more efficient utilization of communication resources, among other advantages.

Figure 11:
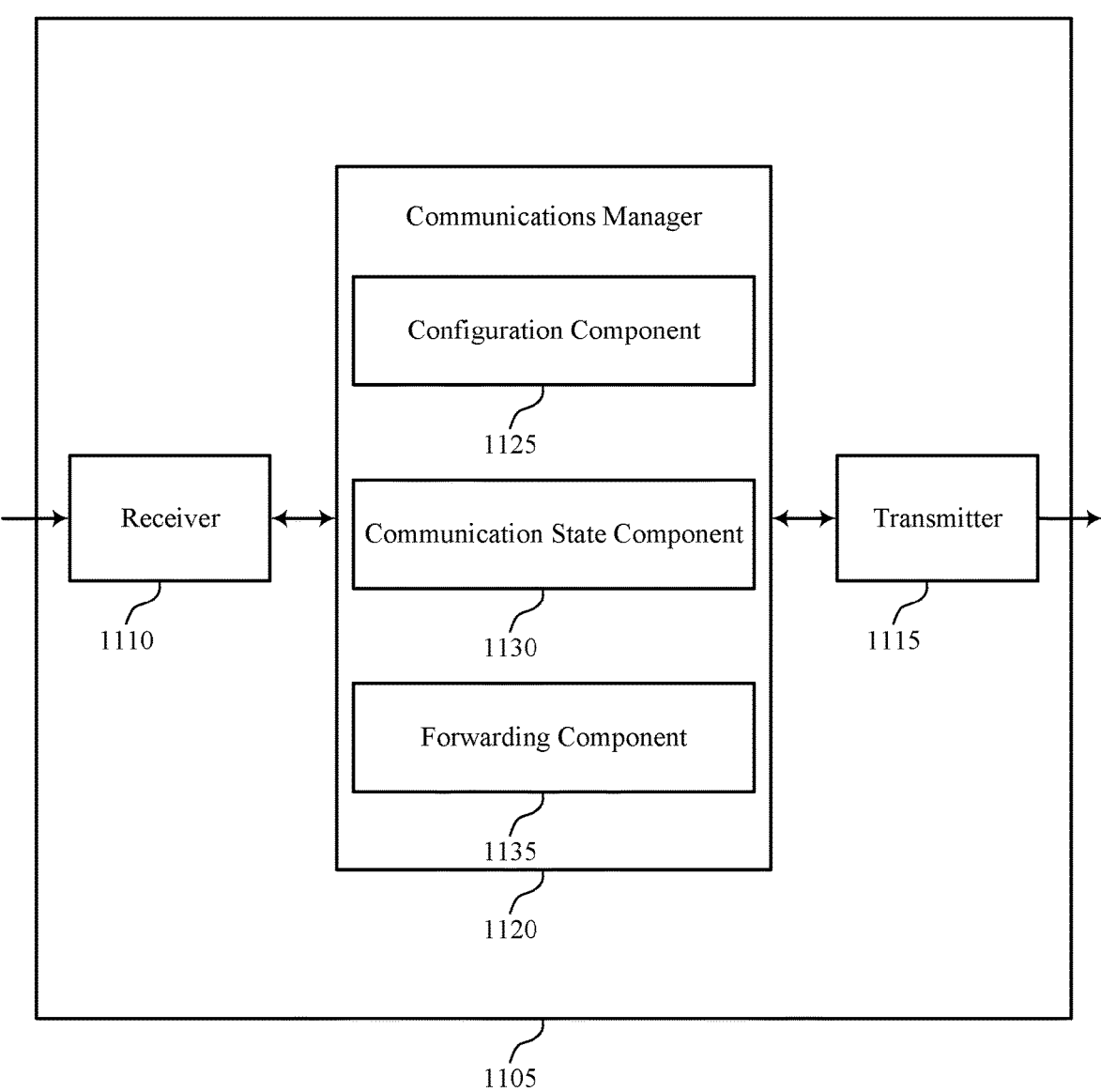

FIG. 11 shows a block diagram 1100 of a device 1105 that supports techniques for TPC with RISs in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas.

Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for TPC with RISs as described herein. For example, the communications manager 1120 may include a configuration component 1125, a communication state component 1130, a forwarding component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The configuration component 1125 is capable of, configured to, or operable to support a means for transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE. The communication state component 1130 is capable of, configured to, or operable to support a means for transmitting, to the first UE, an indication of a first communication state from a set of multiple communication states, where the first communication state is associated with a first parameter set of the set of multiple parameter sets. The communication state component 1130 is capable of, configured to, or operable to support a means for communicating with the first UE based on transmitting the indication of the first communication state.

Additionally, or alternatively, the communications manager 1120 may support wireless communications at a wireless node in accordance with examples as disclosed herein. The configuration component 1125 is capable of, configured to, or operable to support a means for receiving, from a network entity, a control message indicating a set of multiple parameters associated with a set of multiple communication links, the set of multiple communication links including at least a sidelink communication link and an uplink communication link. The configuration component 1125 is capable of, configured to, or operable to support a means for receiving a second control message indicating a communication link of the set of multiple communication links to be used by a UE for transmitting signaling. The forwarding component 1135 is capable of, configured to, or operable to support a means for receiving, from the UE, the signaling via the communication link from the set of multiple communication links. The forwarding component 1135 is capable of, configured to, or operable to support a means for forwarding the signaling to a network entity or a second UE based on the parameters associated with the communication link.

Figure 12:
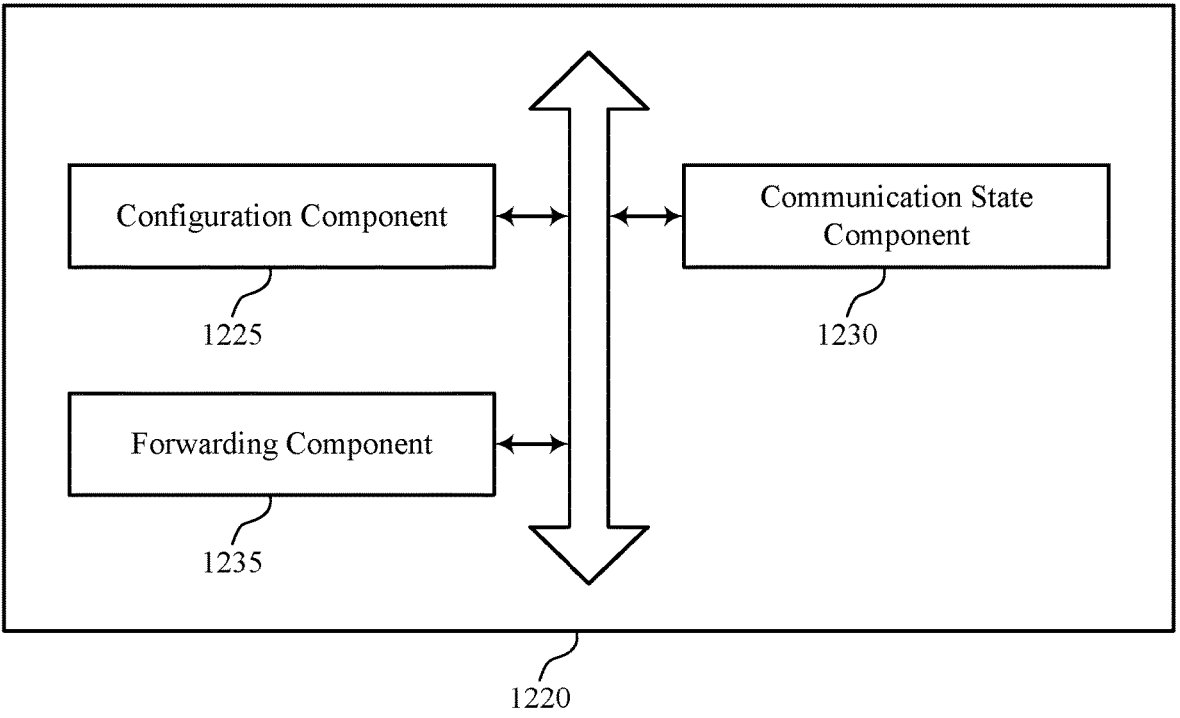
FIG. 12 shows a block diagram of a communications manager that supports techniques for TPC with RISs in accordance with one or more aspects of the present disclosure.

FIG. 12 shows a block diagram 1200 of a communications manager 1220 that supports techniques for TPC with RISs in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for TPC with RISs as described herein. For example, the communications manager 1220 may include a configuration component 1225, a communication state component 1230, a forwarding component 1235, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The configuration component 1225 is capable of, configured to, or operable to support a means for transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE. The communication state component 1230 is capable of, configured to, or operable to support a means for transmitting, to the first UE, an indication of a first communication state from a set of multiple communication states, where the first communication state is associated with a first parameter set of the set of multiple parameter sets. In some examples, the communication state component 1230 is capable of, configured to, or operable to support a means for communicating with the first UE based on transmitting the indication of the first communication state.

In some examples, the configuration component 1225 is capable of, configured to, or operable to support a means for transmitting, to the one or more wireless nodes, a first control message indicating a set of multiple parameters associated with a set of multiple communication links including at least the communication link associated with the transmission by the first UE.

In some examples, the configuration component 1225 is capable of, configured to, or operable to support a means for transmitting, to the one or more wireless nodes, a second control message indicating the communication link associated with the transmission by the first UE.

In some examples, the first communication state is based on one or more wireless node identifiers associated with the one or more wireless nodes.

In some examples, each communication state from the set of multiple communication states is associated with a respective parameter set of the set of multiple parameter sets.

In some examples, each parameter set of the set of multiple parameter sets includes a first parameter associated with an elemental antenna gain.

In some examples, the communication link includes a sidelink communication link or an uplink communication link.

In some examples, the one or more wireless nodes include one or more RISs.

Additionally, or alternatively, the communications manager 1220 may support wireless communications at a wireless node in accordance with examples as disclosed herein. In some examples, the configuration component 1225 is capable of, configured to, or operable to support a means for receiving, from a network entity, a control message indicating a set of multiple parameters associated with a set of multiple communication links, the set of multiple communication links including at least a sidelink communication link and an uplink communication link. In some examples, the configuration component 1225 is capable of, configured to, or operable to support a means for receiving a second control message indicating a communication link of the set of multiple communication links to be used by a UE for transmitting signaling. The forwarding component 1235 is capable of, configured to, or operable to support a means for receiving, from the UE, the signaling via the communication link from the set of multiple communication links. In some examples, the forwarding component 1235 is capable of, configured to, or operable to support a means for forwarding the signaling to a network entity or a second UE based on the parameters associated with the communication link.

In some examples, the set of multiple parameters includes a beamforming weight associated with each communication link of the set of multiple communication links.

In some examples, the second control message is received from the UE or from the network entity.

In some examples, the wireless node is a RIS.

Figure 13:
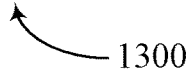
FIG. 13 shows a diagram of a system including a device that supports techniques for TPC with RISs in accordance with one or more aspects of the present disclosure.

FIG. 13 shows a diagram of a system 1300 including a device 1305 that supports techniques for TPC with RISs in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for TPC with RISs). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE. The communications manager 1320 is capable of, configured to, or operable to support a means for transmitting, to the first UE, an indication of a first communication state from a set of multiple communication states, where the first communication state is associated with a first parameter set of the set of multiple parameter sets. The communications manager 1320 is capable of, configured to, or operable to support a means for communicating with the first UE based on transmitting the indication of the first communication state.

Additionally, or alternatively, the communications manager 1320 may support wireless communications at a wireless node in accordance with examples as disclosed herein. For example, the communications manager 1320 is capable of, configured to, or operable to support a means for receiving, from a network entity, a control message indicating a set of multiple parameters associated with a set of multiple communication links, the set of multiple communication links including at least a sidelink communication link and an uplink communication link. The communications manager 1320 is capable of, configured to, or operable to support a means for receiving a second control message indicating a communication link of the set of multiple communication links to be used by a UE for transmitting signaling. The communications manager 1320 is capable of, configured to, or operable to support a means for receiving, from the UE, the signaling via the communication link from the set of multiple communication links. The communications manager 1320 is capable of, configured to, or operable to support a means for forwarding the signaling to a network entity or a second UE based on the parameters associated with the communication link.

By including or configuring the communications manager 1320 in accordance with examples as described herein, the device 1305 may support techniques for TPC with RISs which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting)

using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for TPC with RISs as described herein, or the processor 1335 and the memory 1325 may be otherwise configured to perform or support such operations.

FIG. 14 shows a flowchart illustrating a method 1400 that supports techniques for TPC with RISs in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a control message indicating a set of multiple parameter sets associated with calculating a transmission power for a transmission by the first UE, where each parameter set of the set of multiple parameter sets is associated with a communication link, a presence of one or more wireless nodes, and whether the one or more wireless nodes are assisting the first UE or a second UE. The operations of block 1405 may be performed in accordance with examples as disclosed herein. In some examples, aspects of the operations of 1405 may be performed by a configuration component 825 as described with reference to FIG. 8.

At 1410, the method may include transmitting signaling in accordance with a calculated transmission power based on selecting a first parameter set from the set of multiple parameter sets, where the first parameter set is selected based on a communication link associated with the transmission, a presence of one or more wireless nodes during the transmission, and whether the one or more wireless nodes are assisting the first UE or the second UE. The operations of block 1410 may be performed in accordance with examples as disclosed herein. In some examples, aspects of the operations of 1410 may be performed by a power controls component 830 as described with reference to FIG. 8.

FIG. 15 shows a flowchart illustrating a method 1500 that supports techniques for TPC with RISs in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a control message indicating a set of multiple parameter sets associated with calculation of a transmission power by a first UE, where each parameter set of the set of multiple parameter sets is associated with a communication link associated with a transmission by the first UE, a presence of one or more wireless nodes in proximity to the first UE, and whether the one or more wireless nodes are assisting the first UE or a second UE. The operations of block 1505 may be performed in accordance with examples as disclosed herein. In some examples, aspects of the operations of 1505 may be performed by a configuration component 1225 as described with reference to FIG. 12.

At 1510, the method may include transmitting, to the first UE, an indication of a first communication state from a set of multiple communication states, where the first communication state is associated with a first parameter set of the set of multiple parameter sets. The operations of block 1510 may be performed in accordance with examples as disclosed herein. In some examples, aspects of the operations of 1510 may be performed by a communication state component 1230 as described with reference to FIG. 12.

At 1515, the method may include communicating with the first UE based on transmitting the indication of the first communication state. The operations of block 1515 may be performed in accordance with examples as disclosed herein. In some examples, aspects of the operations of 1515 may be performed by a communication state component 1230 as described with reference to FIG. 12.

FIG. 16 shows a flowchart illustrating a method 1600 that supports techniques for TPC with RISs in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a network entity, a control message indicating a set of multiple parameters associated with a set of multiple communication links, the set of multiple communication links including at least a sidelink communication link and an uplink communication link. The operations of block 1605 may be performed in accordance with examples as disclosed herein. In some examples, aspects of the operations of 1605 may be performed by a configuration component 1225 as described with reference to FIG. 12.

At 1610, the method may include receiving a second control message indicating a communication link of the set of multiple communication links to be used by a UE for transmitting signaling. The operations of block 1610 may be performed in accordance with examples as disclosed herein. In some examples, aspects of the operations of 1610 may be performed by a configuration component 1225 as described with reference to FIG. 12.

At 1615, the method may include receiving, from the UE, the signaling via the communication link from the set of multiple communication links. The operations of block 1615 may be performed in accordance with examples as disclosed herein. In some examples, aspects of the operations of 1615 may be performed by a forwarding component 1235 as described with reference to FIG. 12.

At 1620, the method may include forwarding the signaling to a network entity or a second UE based on the parameters associated with the communication link. The operations of block 1620 may be performed in accordance with examples as disclosed herein. In some examples, aspects of the operations of 1620 may be performed by a forwarding component 1235 as described with reference to FIG. 12. The following provides an overview of aspects of the present disclosure:

Aspect 1: A method for wireless communications at a first UE, comprising: receiving, from a network entity, a control message indicating a plurality of parameter sets associated with calculating a transmission power for a transmission by the first UE, wherein each parameter set of the plurality of parameter sets is associated with a communication link, a presence of one or more wireless nodes, and whether the one or more wireless nodes are assisting the first UE or a second UE; and transmitting signaling in accordance with a calculated transmission power based at least in part on selecting a first parameter set from the plurality of parameter sets, wherein the first parameter set is selected based at least in part on a communication link associated with the transmission, a presence of one or more wireless nodes during the transmission, and whether the one or more wireless nodes are assisting the first UE or the second UE.

Aspect 2: The method of aspect 1, further comprising: determining the one or more wireless nodes are present within a threshold proximity of the UE, wherein the first parameter set is associated with the one or more wireless nodes being present.

Aspect 3: The method of aspect 2, further comprising: determining whether the one or more wireless nodes are assisting the first UE or the second UE, wherein selecting the first parameter set is based at least in part on the determining.

Aspect 4: The method of aspect 3, wherein determining whether the one or more wireless nodes are assisting the first UE or the second UE, comprises: receiving an indication of whether the first UE or the second UE, are communicating with the network entity via the one or more wireless nodes.

Aspect 5: The method of any of aspects 3 through 4, wherein determining whether the one or more wireless nodes are assisting the first UE or the second UE, comprises: transmitting a reservation message to the one or more wireless nodes, wherein determining whether the first UE is communicating with the network entity via the one or more wireless nodes is based at least in part on receiving a confirmation message responsive to the reservation message.

Aspect 6: The method of any of aspects 2 through 5, wherein the first parameter set is associated with one or more wireless node identifiers associated with the one or more wireless nodes.

Aspect 7: The method of any of aspects 2 through 6, further comprising: transmitting, to the one or more wireless nodes, a control message indicating a plurality of parameters associated with a plurality of communication links including at least the communication link associated with the transmission by the first UE.

Aspect 8: The method of aspect 1, further comprising: determining the one or more wireless nodes are not present within a threshold proximity of the UE, wherein the first parameter set is associated with the one or more wireless nodes not being present.

Aspect 9: The method of any of aspects 1 through 8, further comprising: identifying a first communication state from a plurality of communication states based at least in part on the communication link associated with transmission of the signaling, the presence of one or more wireless nodes during the transmission, and whether the one or more wireless nodes are assisting the first UE or the second UE, wherein the first set of parameters is associated with the first communication state.

Aspect 10: The method of aspect 9, further comprising: receiving, from the network entity, an indication of the first communication state from the plurality of communication states, wherein applying the first parameter set is based at least in part on receiving the indication.

Aspect 11: The method of any of aspects 9 through 10, wherein each communication state of the plurality of communication states is associated with a communication link, a presence of one or more wireless nodes, and whether the one or more wireless nodes are assisting the first UE or a second UE.

Aspect 12: The method of any of aspects 1 through 11, further comprising: calculating the transmission power for transmission of the signaling based at least in part on the first parameter set.

Aspect 13: The method of any of aspects 1 through 12, wherein each parameter set of the plurality of parameter sets comprises a first parameter associated with an elemental antenna gain.

Aspect 14: The method of any of aspects 1 through 13, wherein the communication link comprises a sidelink communication link or an uplink communication link.

Aspect 15: The method of any of aspects 1 through 14, wherein the one or more wireless nodes comprise one or more RISs.

Aspect 16: A method for wireless communications at a network entity, comprising: transmitting a control message indicating a plurality of parameter sets associated with calculation of a transmission power by a first UE, wherein each parameter set of the plurality of parameter sets is associated with a communication link associated with a transmission by the first UE, a presence of one or more wireless nodes in proximity to the first UE, and whether the one or more wireless nodes are assisting the first UE or a second UE; transmitting, to the first UE, an indication of a first communication state from a plurality of communication states, wherein the first communication state is associated with a first parameter set of the plurality of parameter sets; and communicating with the first UE based at least in part on transmitting the indication of the first communication state.

Aspect 17: The method of aspect 16, further comprising: transmitting, to the one or more wireless nodes, a first control message indicating a plurality of parameters associated with a plurality of communication links including at least the communication link associated with the transmission by the first UE.

Aspect 18: The method of aspect 17, further comprising: transmitting, to the one or more wireless nodes, a second control message indicating the communication link associated with the transmission by the first UE.

Aspect 19: The method of any of aspects 16 through 18, wherein the first communication state is based at least in part on one or more wireless node identifiers associated with the one or more wireless nodes.

Aspect 20: The method of any of aspects 16 through 19, wherein each communication state from the plurality of communication states is associated with a respective parameter set of the plurality of parameter sets.

Aspect 21: The method of any of aspects 16 through 20, wherein each parameter set of the plurality of parameter sets comprises a first parameter associated with an elemental antenna gain.

Aspect 22: The method of any of aspects 16 through 21, wherein the communication link comprises a sidelink communication link or an uplink communication link.

Aspect 23: The method of any of aspects 16 through 22, wherein the one or more wireless nodes comprise one or more RISs.

Aspect 24: A method for wireless communications at a wireless node, comprising: receiving, from a network entity, a control message indicating a plurality of parameters associated with a plurality of communication links, the plurality of communication links including at least a sidelink communication link and an uplink communication link; receiving a second control message indicating a communication link of the plurality of communication links to be used by a UE for transmitting signaling; receiving, from the UE, the signaling via the communication link from the plurality of communication links; and forwarding the signaling to a network entity or a second UE based at least in part on the parameters associated with the communication link.

Aspect 25: The method of aspect 24, wherein the plurality of parameters comprises a beamforming weight associated with each communication link of the plurality of communication links.

Aspect 26: The method of any of aspects 24 through 25, wherein the second control message is received from the UE or from the network entity.

Aspect 27: The method of any of aspects 24 through 26, wherein the wireless node is a RIS.

Aspect 28: An apparatus for wireless communications at a first UE, comprising at least one processor; at least one memory coupled with the at least one processor; and instructions stored in the at least one memory and executable by the at least one processor to cause the apparatus to perform a method of any of aspects 1 through 15.

Aspect 29: An apparatus for wireless communications at a first UE, comprising at least one means for performing a method of any of aspects 1 through 15.

Aspect 30: A non-transitory computer-readable medium storing code for wireless communications at a first UE, the code comprising instructions executable by a processor to perform a method of any of aspects 1 through 15.

Aspect 31: An apparatus for wireless communications at a network entity, comprising at least one processor; at least one memory coupled with the at least one processor; and instructions stored in the at least one memory and executable by the at least one processor to cause the apparatus to perform a method of any of aspects 16 through 23.

Aspect 32: An apparatus for wireless communications at a network entity, comprising at least one means for performing a method of any of aspects 16 through 23.

Aspect 33: A non-transitory computer-readable medium storing code for wireless communications at a network entity, the code comprising instructions executable by a processor to perform a method of any of aspects 16 through 23.

Aspect 34: An apparatus for wireless communications at a wireless node, comprising at least one processor; at least one memory coupled with the at least one processor; and instructions stored in the at least one memory and executable by the at least one processor to cause the apparatus to perform a method of any of aspects 24 through 27.

Aspect 35: An apparatus for wireless communications at a wireless node, comprising at least one means for performing a method of any of aspects 24 through 27.

Aspect 36: A non-transitory computer-readable medium storing code for wireless communications at a wireless node, the code comprising instructions executable by a processor to perform a method of any of aspects 24 through 27

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:

at least one processor;

at least one memory coupled with the at least one processor; and instructions stored in the at least one memory and executable by the at least one processor to cause the apparatus to:

receive, from a network entity, a control message indicating a plurality of parameter sets used for calculating a transmission power for a transmission by the first UE, wherein each parameter set of the plurality of parameter sets is associated with a communication link, a presence of one or more wireless nodes, and whether the one or more wireless nodes are assisting the first UE or a second UE;

select, by the first UE, a first parameter set from among the plurality of parameter sets, wherein the first parameter set is selected based at least in part on a communication link associated with the transmission, a presence of one or more wireless nodes during the transmission, and whether the one or more wireless nodes are assisting the first UE or the second UE;

determine a transmission power using the first parameter set selected from among the plurality of parameter sets; and transmit signaling in accordance with the determined transmission power based at least in part on selecting the first parameter set.

2. The apparatus of claim 1, wherein the instructions are further executable by the at least one processor to cause the apparatus to:

determine the one or more wireless nodes are present within a threshold proximity of the UE, wherein the first parameter set is associated with the one or more wireless nodes being present.

3. The apparatus of claim 2, wherein the instructions are further executable by the at least one processor to cause the apparatus to:

determine whether the one or more wireless nodes are assisting the first UE or the second UE, wherein selecting the first parameter set is based at least in part on the determining.

4. The apparatus of claim 3, wherein the instructions to determine whether the one or more wireless nodes are assisting the first UE or the second UE, are executable by the at least one processor to cause the apparatus to:

receive an indication of whether the first UE or the second UE, are communicating with the network entity via the one or more wireless nodes.

5. The apparatus of claim 3, wherein the instructions to determine whether the one or more wireless nodes are assisting the first UE or the second UE, are executable by the at least one processor to cause the apparatus to:

transmit a reservation message to the one or more wireless nodes, wherein determining whether the first UE is communicating with the network entity via the one or more wireless nodes is based at least in part on receiving a confirmation message responsive to the reservation message.

6. The apparatus of claim 2, wherein the first parameter set is associated with one or more wireless node identifiers associated with the one or more wireless nodes.

7. The apparatus of claim 2, wherein the instructions are further executable by the at least one processor to cause the apparatus to:

transmit, to the one or more wireless nodes, a control message indicating a plurality of parameters associated with a plurality of communication links including at least the communication link associated with the transmission by the first UE.

8. The apparatus of claim 1, wherein the instructions are further executable by the at least one processor to cause the apparatus to:

determine the one or more wireless nodes are not present within a threshold proximity of the UE, wherein the first parameter set is associated with the one or more wireless nodes not being present.

9. The apparatus of claim 1, wherein the instructions are further executable by the at least one processor to cause the apparatus to:

identify a first communication state from a plurality of communication states based at least in part on the communication link associated with the transmission of the signaling, the presence of the one or more wireless nodes during the transmission, and whether the one or more wireless nodes are assisting the first UE or the second UE, wherein the first set of parameters is associated with the first communication state.

10. The apparatus of claim 9, wherein the instructions are further executable by the at least one processor to cause the apparatus to:

receive, from the network entity, an indication of the first communication state from the plurality of communication states, wherein applying the first parameter set is based at least in part on receiving the indication.

11. The apparatus of claim 9, wherein each communication state of the plurality of communication states is associated with the communication link, the presence of one or more wireless nodes, and whether the one or more wireless nodes are assisting the first UE or a second UE.

12. The apparatus of claim 1, wherein each parameter set of the plurality of parameter sets comprises a first parameter associated with an elemental antenna gain.

13. The apparatus of claim 1, wherein the communication link comprises a sidelink communication link or an uplink communication link.

14. The apparatus of claim 1, wherein the one or more wireless nodes comprise one or more reconfigurable intelligent surfaces.

15. An apparatus for wireless communications at a network entity, comprising:

at least one processor;

at least one memory coupled with the at least one processor; and instructions stored in the at least one memory and executable by the at least one processor to cause the apparatus to:

transmit a control message indicating a plurality of parameter sets used for calculation of a transmission power by a first UE, wherein each parameter set of the plurality of parameter sets is associated with a communication link associated with a transmission by the first UE, a presence of one or more wireless nodes in proximity to the first UE, and whether the one or more wireless nodes are assisting the first UE or a second UE;

transmit, to the first UE, an indication of a first communication state of the first UE from a plurality of communication states of the first UE, wherein the first communication state of the first UE is associated with a first parameter set of the plurality of parameter sets; and communicate with the first UE based at least in part on transmitting the indication of the first communication state.

16. The apparatus of claim 15, wherein the instructions are further executable by the at least one processor to cause the apparatus to:

transmit, to the one or more wireless nodes, a first control message indicating a plurality of parameters associated with a plurality of communication links including at least the communication link associated with the transmission by the first UE.

17. The apparatus of claim 16, wherein the instructions are further executable by the at least one processor to cause the apparatus to:

transmit, to the one or more wireless nodes, a second control message indicating the communication link associated with the transmission by the first UE.

18. The apparatus of claim 15, wherein the first communication state of the first UE is based at least in part on one or more wireless node identifiers associated with the one or more wireless nodes.

19. The apparatus of claim 15, wherein each communication state of the first UE from the plurality of communication states of the first UE is associated with a respective parameter set of the plurality of parameter sets used for calculation of the transmission power by the first UE.

20. The apparatus of claim 15, wherein each parameter set of the plurality of parameter sets comprises a first parameter associated with an elemental antenna gain.

21. The apparatus of claim 15, wherein the communication link comprises a sidelink communication link or an uplink communication link.

22. The apparatus of claim 15, wherein the one or more wireless nodes comprise one or more reconfigurable intelligent surfaces.

23. A method for wireless communications at a first user equipment (UE), comprising:

receiving, from a network entity, a control message indicating a plurality of parameter sets used for calculating a transmission power for a transmission by the first UE, wherein each parameter set of the plurality of parameter sets is associated with a communication link, a presence of one or more wireless nodes, and whether the one or more wireless nodes are assisting the first UE or a second UE;

selecting, by the first UE, a first parameter set from among the plurality of parameter sets, wherein the first parameter set is selected based at least in part on a communication link associated with the transmission, a presence of one or more wireless nodes during the transmission, and whether the one or more wireless nodes are assisting the first UE or the second UE;

determining a transmission power using the first parameter set selected from among the plurality of parameter sets; and transmitting signaling in accordance with the determined transmission power based at least in part on selecting the first parameter set.

24. The method of claim 23, further comprising:

determining the one or more wireless nodes are present within a threshold proximity of the UE, wherein the first parameter set is associated with the one or more wireless nodes being present.

25. The method of claim 24, further comprising:

determining whether the one or more wireless nodes are assisting the first UE or the second UE, wherein selecting the first parameter set is based at least in part on the determining.

26. The method of claim 24, further comprising:

transmitting, to the one or more wireless nodes, a control message indicating a plurality of parameters associated with a plurality of communication links including at least the communication link associated with the transmission by the first UE.

27. The method of claim 23, further comprising:

determining the one or more wireless nodes are not present within a threshold proximity of the UE, wherein the first parameter set is associated with the one or more wireless nodes not being present.

28. A method for wireless communications at a network entity, comprising:

transmitting a control message indicating a plurality of parameter sets used for calculation of a transmission power by a first UE, wherein each parameter set of the plurality of parameter sets is associated with a communication link associated with a transmission by the first UE, a presence of one or more wireless nodes in proximity to the first UE, and whether the one or more wireless nodes are assisting the first UE or a second UE;

transmitting, to the first UE, an indication of a first communication state of the first UE from a plurality of communication states of the first UE, wherein the first communication state is associated with a first parameter set of the plurality of parameter sets; and communicating with the first UE based at least in part on transmitting the indication of the first communication state.

* * * * *